United States Patent
Fisher

(10) Patent No.: US 10,662,089 B2
(45) Date of Patent: May 26, 2020

(54) APPARATUS FOR TREATING, PURIFYING AND/OR EXTRACTING FROM WASTEWATER

(71) Applicant: FisherH2O, LLC, Richmond, VA (US)

(72) Inventor: David Keith Fisher, Burgess, VA (US)

(73) Assignee: FISHERH2O, LLC, Richmond, VA (US)

( * ) Notice: Subject to any disclaimer, the term of this patent is extended or adjusted under 35 U.S.C. 154(b) by 0 days.

(21) Appl. No.: 16/446,270

(22) Filed: Jun. 19, 2019

(65) Prior Publication Data

US 2019/0382290 A1  Dec. 19, 2019

Related U.S. Application Data

(60) Provisional application No. 62/687,092, filed on Jun. 19, 2018.

(51) Int. Cl.
| | |
|---|---|
| C02F 1/46 | (2006.01) |
| C02F 1/461 | (2006.01) |
| C02F 101/20 | (2006.01) |
| C02F 103/26 | (2006.01) |

(52) U.S. Cl.
CPC ............... C02F 1/46109 (2013.01); *C02F 2001/46171* (2013.01); *C02F 2101/20* (2013.01); *C02F 2103/26* (2013.01); *C02F 2201/002* (2013.01); *C02F 2201/483* (2013.01)

(58) Field of Classification Search
CPC ....... B01J 8/20; B01J 8/42; B01J 19/12; B01J 8/24; C10J 3/18; C10J 3/46; C10J 3/84; C10J 2300/1603; C10J 2200/12; C10J 2300/123; C10J 2300/0933; C10J 2300/0973; C10J 2200/36; C10J 3/02
See application file for complete search history.

(56) References Cited

U.S. PATENT DOCUMENTS

| | | | |
|---|---|---|---|
| 4,643,809 A * | 2/1987 | Botts | B01J 8/20 204/155 |
| 9,181,470 B2 * | 11/2015 | Nguyen | C09K 8/80 |
| 2013/0206587 A1 * | 8/2013 | Eckelberry | C02F 1/46104 204/230.2 |
| 2015/0191366 A1 | 7/2015 | Eckelberry | |
| 2016/0045841 A1 | 2/2016 | Kaplan et al. | |

FOREIGN PATENT DOCUMENTS

| | | |
|---|---|---|
| AU | 2006265773 C1 | 1/2007 |
| CN | 101773776 A * | 7/2010 |

(Continued)

OTHER PUBLICATIONS

CN-101773776-A English translation of abstract; Zhiqin Lai (Year: 2010).*

(Continued)

*Primary Examiner* — Cameron J Allen
(74) *Attorney, Agent, or Firm* — Nixon & Vanderhye, P.C.

(57) ABSTRACT

An efficient, cost-effective, and efficacious technique for removing coal ash and other pollutants from waterways, ponds, marshes, holding tanks and other water sources and supplies. An apparatus comprising an open cage including electromagnets and/or permanent magnets and/or electrodes is supplied with electrical power to extract materials such as rare earth elements and/or heavy metals. The materials levitate to the surface, forming a slurry while leaving water substantially free of such materials.

30 Claims, 28 Drawing Sheets

(56) References Cited

FOREIGN PATENT DOCUMENTS

| FR | 2574559 A1 | 6/1986 |
|---|---|---|
| JP | 2003-144002 A | 5/2003 |
| JP | 2004-314033 A | 11/2004 |
| WO | 02/26637 A1 | 4/2002 |
| WO | 2013/144664 A1 | 10/2013 |

OTHER PUBLICATIONS

International Search Report for corresponding PCT/US2019/037934, dated Oct. 8, 2019, 6 pages.
Written Opinion for corresponding PCT/US2019/037934, dated Oct. 8, 2019, 8 pages.
American Society for Testing and Materials, ASTM D1141-98, Standard Practice for the Preparation of Substitute Ocean Water, 2013.
United States Code of Federal Regulations (CFR), Title 40, Chapter I, Subchapter D, Part 141—National Primary Drinking Water Regulations, Jun. 2019.
United States Environmental Protection Agency (EPA), Coal Ash Basics, updated Feb. 5, 2019.
United States Environmental Protection Agency (EPA), Drinking Water Regulations, updated Sep. 1, 2017.
United States Federal Register, Hazardous and Solid Waste Management System; Disposal of Coal Combustion Residuals from Electric Utilities, vol. 80, No. 74, Part II, 40 CFR Parts 257 and 261, Apr. 17, 2015, pp. 21302-21501.
Alger, Philip Langdon, "The Nature of Polyphase Induction Machines," John Wiley & Sons, Inc., 1951, 397 pages.
Ayers, David M., et al., "Removing Heavy Metals from Wastewater," University of Maryland, Engineering Research Center Report, Aug. 1994, 21 pages.
Chan, C. C., et al., "Analysis of Electromagnetic and Thermal Fields for Induction Motors During Starting," IEEE Transactions on Energy Conversion, vol. 9, No. 1, Mar. 1994, pp. 53-60.
Chaplin, Martin, "Electrolysis of Water," Apr. 1, 2019, 5 pages.
Ho, Shine, "Analysis and Design of AC Induction Motors with Squirrel Cage Rotors," Dissertation, University of New Hampshire, Sep. 1996, 184 pages.
Hutton, M., "Human Health Concerns of Lead, Mercury, Cadmium and Arsenic," Chapter 6, Lead, Mercury, Cadmium and Arsenic in the Environment, John Wiley & Sons Ltd, 1987, pp. 53-68.
Lin, Ming-Yuan, et al., "The effect of magnetic force on hydrogen production efficiency in water electrolysis," Fuel and Energy Abstracts, vol. 37, No. 2, Jan. 2012, pp. 1311-1320.
Lin, Ming-Yuan, et al., "Effect of Lorentz Force on Hydrogen Production in Water Electrolysis Employing Multielectrodes," Journal of Marine Science and Technology, vol. 24, No. 3, 2016, pp. 511-518.
Ni'Am, Moh Faiqun, et al., "Combined Magnetic Field and Electrocoagulation Process for Suspended Solid Removal from Wastewater," Proceedings of the 1st International Conference on Natural Resources Engineering & Technology 2006, Jul. 2006, pp. 384-393.
Rossmeisl, J., et al., "Electrolysis of water on (oxidized) metal surfaces," Chemical Physics, vol. 319, 2005, pp. 178-184.
Shen, Muzhong, et al., "A concise model for evaluating water electrolysis," International Journal of Hydrogen Energy, vol. 36, 2011, pp. 14335-14341.
Trzynadlowski, Andrzej M., "The Field Orientation Principle in Control of Induction Motors", The Kluwer International Series in Engineering and Computer Science, Springer Science+Business Media, LLC, 1994, 255 pages.
Van Der Niet, Maria J. T. C., et al., "Water dissociation on well-defined platinum surfaces: The electrochemical perspective," Catalysis Today, vol. 202, Mar. 15, 2013, pp. 105-113.
Veinott, Cyril G., "Theory and Design of Small Induction Motors," McGraw-Hill Book Company, Inc., 1959, 477 pages.
Virgen, Ma. del Rosario Moreno, et al., "Removal of Heavy Metals Using Adsorption Processes Subject to an External Magnetic Field," Chapter 15, IntechOpen.74050, 2018, pp. 253-280.
Zaidi, Nur Syamimi, et al., "Magnetic Field Application and its Potential in Water and Wastewater Treatment Systems," Separation & Purification Reviews, vol. 43, 2014, pp. 206-240.

\* cited by examiner

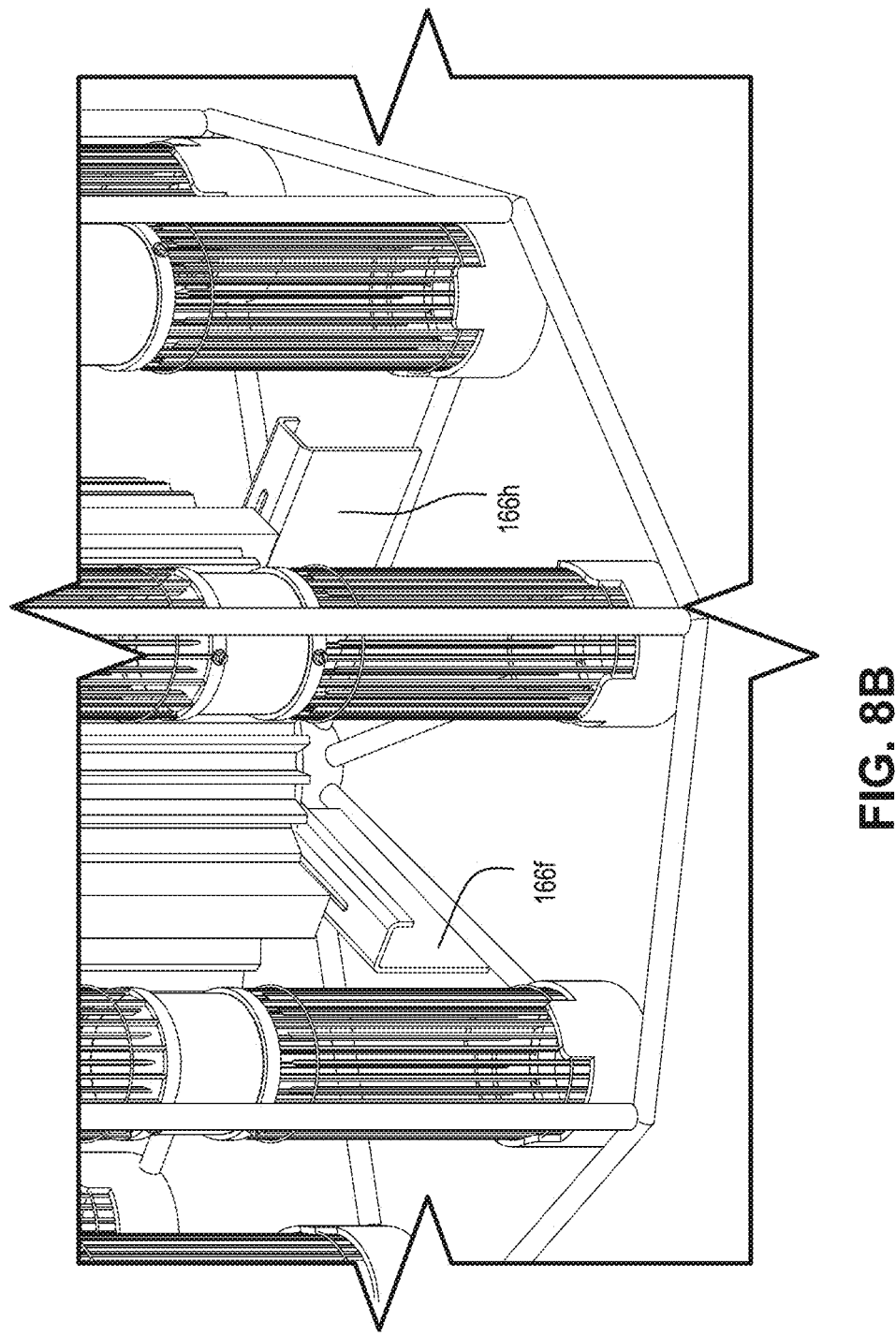

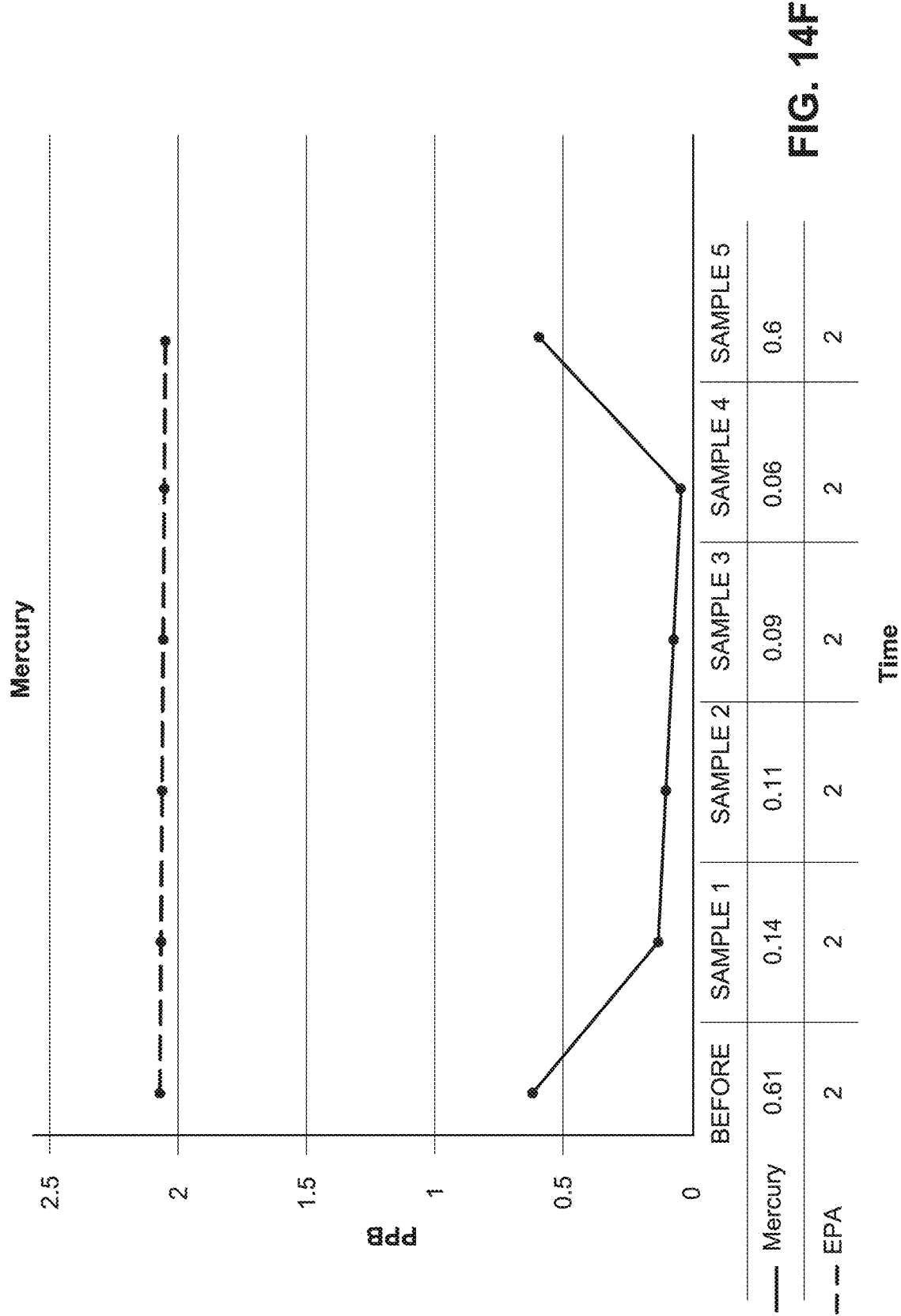

APPARATUS FOR TREATING, PURIFYING AND/OR EXTRACTING FROM WASTEWATER

CROSS-REFERENCE TO RELATED APPLICATIONS

This application claims priority from U.S. Provisional Patent Application No. 62/687,092 filed 19 Jun. 2018 in the name of David Keith Fisher and entitled "WASTEWATER PURIFICATION SYSTEMS AND METHODS", which application is incorporated herein by reference for all purposes.

STATEMENT REGARDING FEDERALLY SPONSORED RESEARCH OR DEVELOPMENT

None.

FIELD

This technology relates to methods and apparatus for cleaning or otherwise removing materials from liquids and/or fluids, and more particularly for extracting metals from aqueous solutions. Example non-limiting embodiments relate to methods and apparatus for using electrical phenomena, such as electromagnetic fields, and/or electrochemical reactions, such as electrolysis, to purify water and remove pollutants. Still more particularly, example non-limiting embodiments provide, as one case, method and apparatus for purifying aqueous solutions containing pollutants such as for example coal ash or components of coal ash.

BACKGROUND

Coal ash, also referred to as coal combustion residuals or CCRs, is produced primarily from burning coal such as at coal-fired power plants. Coal ash includes a number of by-products produced from burning coal, including
 Fly Ash: a fine, powdery material generally composed mostly of silica made from burning finely ground coal in a boiler.
 Bottom Ash: a coarse, angular ash particle that is too large to be carried up into smoke stacks, so it forms in the bottom of the coal furnace.
 Boiler Slag: molten bottom ash from slag tap and cyclone type furnaces that turns into pellets that have a smooth glassy appearance after cooled with water.
 Flue Gas Desulphurization Material: material left over from the process of reducing sulfur-dioxide emissions from a coal-fired boiler that can be a wet sludge consisting of calcium sulfite or calcium sulfate or a dry powdered material that is a mixture of calcium sulfites and calcium sulfates.
 Other types of by-products from burning coal can include:
 fluidized bed combustion ash,
 cenospheres (lightweight, inert, hollow spheres made largely of silica and alumina and filled with air or inert gas, typically produced as a byproduct of coal combustion at thermal power plants), and
 scrubber residues.
 Coal ash is one of the largest types of industrial waste generated in the United States. According to the American Coal Ash Association's Coal Combustion Product Production & Use Survey Report, nearly one hundred thirty million tons of coal ash were generated in 2014. See e.g., United States Environmental Protection Agency (US EPA), "Coal Ash Basics" (Feb. 5, 2019), retrievable from httwww.epa.gov/coalash/coal-ash-basic.

Coal ash is disposed of or used in different ways depending on the type of by-product, the processes at the power plant, and the regulations the power plant has to follow. Some power plants may dispose of coal ash in surface impoundments or in landfills. Others may discharge it into nearby waterways under the plant's water discharge permit.

Coal ash contains toxic metals and metalloids such as mercury, cadmium and arsenic. Without proper management, these contaminants can pollute waterways, ground water, and drinking water. The three metals, lead, mercury and cadmium, and the metalloid arsenic have all caused major human health problems in various parts of the world. The overt toxicity of these elements has been recognized for many years; indeed, the harmful effects of lead were known as far back as the second century BC in ancient Greece. Over the years, physicians became increasingly familiar with the symptoms of metal poisoning arising in occupationally exposed workers and in individual cases of poisoning. Exposure to such metals can cause grave health issues in both adults and children. See Hutton, "Human Health Concerns of Lead, Mercury, Cadmium and Arsenic", Chapter 6, Lead, Mercury, Cadmium and Arsenic in the Environment (John Wiley & Sons 1987).

Large spills near Kingston, Tenn., and Eden, N.C., highlighted need for action to help ensure protective coal ash disposal. These spills caused widespread environmental and economic damage to nearby waterways and properties. In response, the United States Federal Government enacted rules to regulate the disposal of coal ash. See Federal Register 80 FR 21301 (Apr. 17, 2015). More recently, the Environmental Protection Agency has proposed allowing states and the EPA to incorporate flexibilities into their coal ash permit programs.

Waterway pollution resulting from coal ash is far from being solved, and represents a long-felt but unsolved need. What is needed: an efficient, cost-effective, efficacious technique for removing coal ash, coal ash components, and/or other pollutants from waterways, ponds, marshes, holding tanks and other water sources and supplies.

More broadly, the world needs better ways to extract and/or remove trace elements and/or other materials such as for example lead, mercury, cadmium and/or arsenic from liquids such as water.

BRIEF SUMMARY

Non-limiting aspects of exemplary non-limiting technology herein include the following;
 1. A method/process of removing a material from a liquid and/or fluid using an apparatus (e.g., 100) provided herein.
 2. A method/process of removing a material from a liquid and/or fluid using an operating process as set forth in FIG. 2.
 3. A method/process of removing a material from a solid composition that comprises adding a solid composition to a liquid and/or fluid to form a mixture, and using an apparatus (e.g., 100) provided herein to remove the material from the mixture.
 4. A method/process of removing at least one toxic and/or valuable material from a solid composition that comprises adding a solid composition to a liquid and/or fluid to form a mixture, and using an apparatus (e.g., 100) provided herein to remove the at least one toxic and/or valuable material from the mixture, in some instances leaving clean and/or potable water.
5. A method/process of removing a material from a solid composition that comprises adding a solid composition to a liquid and/or fluid to form a mixture, and using an operating process as set forth in FIG. 2 to remove the material from the mixture.
6. The method of 4 or 5 wherein the solid composition is coal ash.
7. The method according to any of 1-6 wherein the material is a pollutant such as a metal (e.g., a heavy metal or metals) and/or a component of coal ash.
8. The method of 7 wherein the pollutant is a component of coal ash.
9. The method of 6 or 7 wherein the coal ash is fly ash, bottom ash, boiler slag, or flue gas.
10. The method according to any of 4-8 wherein the pollutant or solid composition comprises at least one heavy metal.
11. The method of 10 wherein the pollutant or solid composition comprises at least one heavy metal selected from the group consisting of Cr, Co, Cu, Pb, Mn, Ni, Zn, Hg, Ag, and As.
12. The method according to any of 4-11 wherein the pollutant or solid composition comprises at least one metal selected from Ag, As, Ba, Cd, Cr, Hg, Pb, and Se.
13. A method/process of removing and/or extracting a material from a liquid and/or fluid containing coal ash using a cleaning and/or extracting apparatus (e.g., 100) provided herein.
14. A method/process of removing and/or extracting a material from a liquid and/or fluid containing coal ash using an operating process as set forth in FIG. 2.
15. A method/process of removing and/or extracting a material from coal ash that comprises adding coal ash to a liquid and/or fluid to form a mixture, and using a cleaning apparatus (e.g., 100) provided herein to remove and/or extract the material from the mixture.
16. A method/process of removing a material from coal ash that comprises adding coal ash to a liquid and/or fluid to form a mixture, and using an operating process as set forth in FIG. 2 to remove the material from the mixture.
17. The method according to any of 13-16 wherein the coal ash is fly ash, bottom ash, boiler slag, or flue gas.
18. The method according to any of 13-17 wherein the material comprises at least one heavy metal.
19. The method of 18 wherein the material comprises at least one heavy metal selected from the group consisting of Cr, Co, Cu, Pb, Mn, Mg, Mo, Ni, Zn, Hg, Ag, Va, V, Sr, Sb, Be, and As.
20. The method according to any of 13-19 wherein the material comprises at least one metal selected from Ag, As, Ba, Cd, Cr, Hg, Pb, and Se.
21. A method/process of removing and/or extracting a rare earth element from a liquid and/or fluid using a cleaning apparatus (e.g., 100) provided herein.
22. A method/process of removing and/or extracting a rare earth element from a liquid and/or fluid using an operating process as set forth in FIG. 2.
23. A method/process of removing and/or extracting a rare earth element from a soluble, partially soluble, or insoluble composition that comprises adding the composition to a liquid and/or fluid to form a mixture, and using a cleaning apparatus (e.g., 100) provided herein to remove and/or extracting the rare earth element from the mixture.
24. A method/process of removing and/or extracting a rare earth element from a soluble, partially soluble, or insoluble composition that comprises adding the composition to a liquid and/or fluid to form a mixture, and using an operating process as set forth in FIG. 2 to remove and/or extract the rare earth element from the mixture.
25. The method/process according to any of 21-24 wherein the removed and/or extracted rare earth element, comprises at least one of: La, Ce, Pr, Nd, Pm, Sm, Eu, Gd, Tb, Dy, Ho, Er, Tm, Yb, Lu, Sc, and Y.
26. The method/process according to any of 21-25 wherein the removed and/or extracted rare earth element, comprises at least one light rare earth element selected from Sc, La, Ce, Pr, Nd, and Pm.
27. The method/process according to any of 21-26 wherein the removed and/or extracted rare earth element, comprises at least one medium rare earth elements selected from Sm, Eu, and Gd.
28. The method/process according to any of 21-27 wherein the removed and/or extracted rare earth element, comprises at least one heavy rare earth element selected from Tb, Dy, Ho, Er, Tm, Yb, Lu, and Y.
29. A method/process of treating a liquid and/or fluid to remove a contaminant, using a cleaning apparatus (e.g., 100) provided herein to produce treated water.
30. A method/process of treating a liquid and/or fluid to remove a contaminant using an operating process as set forth in FIG. 2, to produce treated water.
31. The method/process according to any of 1-30 wherein the liquid and/or fluid is water.
32. The method/process of 31 wherein the water is flood water, stream water, pit water, or pond water such as tailings pond water.
33. The method/process of 31 or 32 wherein the water is wastewater.
34. The method/process of 33 wherein the wastewater is an industrial wastewater such as an effluent from a food processing and canning operation, runoff from a mining operation, a radioactive waste, a hazardous waste, or an industrial waste from a manufacturing operation.
35. The method/process according to any of 21-26 wherein the wastewater is a heavy metal wastewater such as industrial heavy metal wastewater.
36. The method according to any of 31-35 wherein the water comprises at least one heavy metal selected from the group consisting of Cr, Co, Cu, Pb, Mn, Ni, Zn, Hg, Ag, and As.
37. The method/process according to any of 31-36 wherein the water comprises at least one metal selected from Ag, As, Ba, Cd, Cr, Hg, Pb, and Se.
38. The method/process according to any of 31-34 wherein the water comprises at least one rare earth element, comprises at least one of: La, Ce, Pr, Nd, Pm, Sm, Eu, Gd, Tb, Dy, Ho, Er, Tm, Yb, Lu, Sc, and Y.
39. The method/process according to any of 21-38 wherein the wastewater is a stickwater.
40. The method/process according to any of 1-39, which further comprises collecting the contaminant, metal, heavy metal, or rare earth element.
41. The method/process according to any of 1-40, which further comprises discharging or removing the liquid and/or fluid produced or treated according to the method/process.

42. The method/process according to any of 1-39, which further comprises re-use of the liquid and/or fluid produced or treated according to the method/process to produce wastewater.
43. A method/process of removing and/or extracting a material/a rare earth element/a contaminant/a heavy metal/from a liquid and/or fluid, comprising (a) exposing liquid containing the material/rare earth element/contaminant/heavy metal/coal ash to a magnetic field gradient; and (b) performing electrolysis on the exposed liquid, the electrolysis causing a slurry to rise to the surface of the liquid.
44. The method/process of 43 wherein an electrolyte is added to the liquid or exposed liquid such that the ion concentration of the liquid is sufficient to carry out electrolysis.
45. The method/process of 44 wherein the electrolyte comprises salt of aluminum (e.g., aluminum sulfate or "alum", aluminum chloride, or poly aluminum chloride), iron (e.g., carbonates, chlorides or sulfates), calcium (e.g., carbonates, chlorides or sulfates), sodium (e.g., carbonates, chlorides or sulfates), or a mixture thereof.
46. The method/process according to any of 43-45 wherein the electrolyte comprises sodium carbonate.
47. The method/process according to any of 43-46 wherein the magnetic field gradient is formed by a ferromagnetic rod electromagnet that forms a magnetic field of 200-4500, 300-3000, 400-2500, 500-2000, 600-1500, 800-1300 or 25-1300 Gauss, and a lower stator field coil winding assembly that forms a magnetic field of 15-250, 25-200, 50-170, or 75-150 Gauss.
48. The method/process according to any of 43-45 wherein the magnetic field gradient is formed by a ferromagnetic rod electromagnet that forms a magnetic field of 200-4500, 300-3000, 400-2500, 500-2000, 600-1500, 800-1300 or 25-1300 Gauss, a lower stator field coil winding assembly that forms a magnetic field of 15-250, 25-200, 50-170, or 75-150 Gauss, a middle stator field coil winding assembly that forms a magnetic field of 5-150, 10-100, or 25-75 Gauss, and an upper stator field coil winding assembly that forms a magnetic field of 1-100, 5-75, or 10-50 Gauss.
49. The method/process according to any of 43-45 wherein the magnetic field is formed by at least one electromagnet that forms a magnetic field of 200-4500, 300-3000, 400-2500, 500-2000, 600-1500, 800-1300 or 25-1300 Gauss, which magnetic field is static and uniform, static and non-uniform, dynamic and uniform, or dynamic and non-uniform.
50. The method/process according to any of 43-49 wherein electrolysis is performed by at least one cylindrical electrode assembly that provides alternating anodes and cathodes having a spacing such as 0.5-10 mms, 1-8 mm, or 1-5 mm or about 3 mm.
51. The method/process of 50 wherein the at least one cylindrical electrode assembly contains 2-40, 4-30, 6-30, 10-30, 15-30, or 18-24, alternating anodes and cathodes.
52. The method/process according to any of 50 or 51 wherein electrolysis is performed by 1-24, 2-16, 4-12, or 6-12, circular and/or cylindrical electrode assemblies.
53. The method/process according to any of 43-52 wherein electrolysis is performed by plural (E.g., 3 or 6 or 9 or 12 or 15 or 2 or 4 or 6 or 8 or 10 or 5 or 7 or 11 or 13 or 14 or 16) cylindrical electrode assemblies each having some number such as 24 alternating anodes and cathodes and wherein the spacing of the alternating electrodes in the electrode assemblies is 0.5-10 mms, 1-8 mm, or 1-5 mm or about 33.
54. The method/process according to any of 43-53 wherein electrolysis is performed at 1-10, 2-8, or 3-5 or 2-80 or 6 or 12 or 20 Volts.
55. The method/process according to any of 43-54 wherein electrolysis is performed for 15 minutes to 2 hours, 30 minutes to 2 hours, 45 minutes to 1.5 hours, or 30 minutes to 48 hours.

Additional features of the example non-limiting embodiments include:
1. A method/process of removing a material from a liquid and/or fluid using a cleaning apparatus (e.g., 100) provided herein.
2. A method/process of removing a material from a liquid and/or fluid using an operating process as set forth in FIG. 2.
3. A method/process of removing a material from a solid composition characterized by adding a solid composition to a liquid and/or fluid to form a mixture, and using a cleaning apparatus (e.g., 100) provided herein to remove the material from the mixture, leaving the liquid and/or fluid substantially free of the material.
4. A method/process of removing a material from a solid composition in a mixture comprising a liquid and/or fluid, characterized by using a cleaning apparatus (e.g., 100) provided herein to remove the material from the mixture.
5. A method/process of removing a material from a solid composition characterized by adding a solid composition to a liquid and/or fluid to form a mixture, and using an operating process as set forth in FIG. 2 to remove the material from the mixture or substantially remove the material from the mixture.
6. The method of 4 or 5 wherein the solid composition is coal ash.
7. The method according to any of 1-6 wherein the material is a pollutant such as a metal (e.g., a heavy metals) and/or a component of coal ash
8. The method of 7 wherein the pollutant is a component of coal ash.
9. The method of 6 or 7 wherein the coal ash is fly ash, bottom ash, boiler slag, or flue gas.
10. The method according to any of 4-8 wherein the pollutant or solid composition comprises at least one heavy metal.
11. The method of 10 wherein the pollutant or solid composition comprises at least one heavy metal selected from the group consisting of Cr, Co, Cu, Pb, Mn, Ni, Zn, Hg, Ag, and As.
12. The method according to any of 4-11 wherein the pollutant or solid composition comprises at least one metal selected from Ag, As, Ba, Cd, Cr, Hg, Pb, and Se.
13. A method/process of removing a material from a liquid and/or fluid containing coal ash using a cleaning apparatus (e.g., 100) provided herein.
14. A method/process of removing a material from a liquid and/or fluid containing coal ash using an operating process as set forth in FIG. 2.
15. A method/process of removing a material from coal ash that is characterized by adding coal ash to a liquid and/or fluid to form a mixture, and using a cleaning apparatus (e.g., 100) provided herein to remove the material from the mixture.
16. A method/process of removing a material from coal ash that is characterized by adding coal ash to a liquid and/or fluid to form a mixture, and using an operating process as set forth in FIG. 2 to remove the material from the mixture.

17. The method according to any of 13-16 wherein the coal ash is fly ash, bottom ash, boiler slag, or flue gas.

18. The method according to any of 13-17 wherein the material comprises at least one heavy metal.

19. The method of 18 wherein the material comprises at least one heavy metal selected from the group consisting of Cr, Co, Cu, Pb, Mn, Mg, Mo, Ni, Zn, Hg, Ag, Va, V, Sr, Sb, Be, and As.

20. The method according to any of 13-19 wherein the material comprises at least one metal selected from Ag, As, Ba, Cd, Cr, Hg, Pb, and Se.

21. A method/process of removing a rare earth element from a liquid and/or fluid using a cleaning apparatus (e.g., 100) provided herein.

22. A method/process of removing a rare earth element from a liquid and/or fluid using an operating process as set forth in FIG. 2.

23. A method/process of removing a rare earth element from a soluble, partially soluble, or insoluble composition that is characterized by adding the composition to a liquid and/or fluid to form a mixture, and using a cleaning apparatus (e.g., 100) provided herein to remove the rare earth element from the mixture.

24. A method/process of removing a rare earth element from a soluble, partially soluble, or insoluble composition that is characterized by adding the composition to a liquid and/or fluid to form a mixture, and using an operating process as set forth in FIG. 2 to remove the rare earth element from the mixture.

25. The method/process according to any of 21-24 wherein the removed rare earth element, comprises at least one of: La, Ce, Pr, Nd, Pm, Sm, Eu, Gd, Tb, Dy, Ho, Er, Tm, Yb, Lu, Sc, and Y.

26. The method/process according to any of 21-25 wherein the removed rare earth element, comprises at least one light rare earth element selected from Sc, La, Ce, Pr, Nd, and Pm.

27. The method/process according to any of 21-26 wherein the removed rare earth element, comprises at least one medium rare earth elements selected from Sm, Eu, and Gd.

28. The method/process according to any of 21-27 wherein the removed rare earth element, comprises at least one heavy rare earth element selected from Tb, Dy, Ho, Er, Tm, Yb, Lu, and Y.

29. A method/process of treating a liquid and/or fluid to remove a contaminant, using a cleaning apparatus (e.g., 100) provided herein to produce treated water.

30. A method/process of treating a liquid and/or fluid to remove a contaminant using an operating process as set forth in FIG. 2, to produce treated water.

31. The method/process according to any of 1-30 wherein the liquid and/or fluid is water.

32. The method/process of 31 wherein the water is flood water, stream water, pit water, or pond water such as tailings pond water.

33. The method/process of 31 or 32 wherein the water is wastewater.

34. The method/process of 33 wherein the wastewater is an industrial wastewater such as an effluent from a food processing and canning operation, runoff from a mining operation, a radioactive waste, a hazardous waste, or an industrial waste from a manufacturing operation.

35. The method/process according to any of 21-26 wherein the wastewater is a heavy metal wastewater such as industrial heavy metal wastewater.

36. The method according to any of 31-35 wherein the water comprises at least one heavy metal selected from the group consisting of Cr, Co, Cu, Pb, Mn, Ni, Zn, Hg, Ag, and As.

37. The method/process according to any of 31-36 wherein the water comprises at least one metal selected from Ag, As, Ba, Cd, Cr, Hg, Pb, and Se.

38. The method/process according to any of 31-34 wherein the water comprises at least one rare earth element, comprises at least one of: La, Ce, Pr, Nd, Pm, Sm, Eu, Gd, Tb, Dy, Ho, Er, Tm, Yb, Lu, Sc, and Y.

39. The method/process according to any of 21-38 wherein the wastewater is a stickwater.

40. The method/process according to any of 1-39, which further comprises collecting the contaminant, metal, heavy metal, or rare earth element.

41. The method/process according to any of 1-40, which further comprises discharging or removing the liquid and/or fluid produced or treated according to the method/process.

42. The method/process according to any of 1-39, which is further characterized by re-use of the liquid and/or fluid produced or treated according to the method/process to produce wastewater.

BRIEF DESCRIPTION OF THE DRAWINGS

The following detailed description of exemplary non-limiting illustrative embodiments is to be read in conjunction with the drawings of which:

FIG. 8B shows a detail of example mounting of the FIG. 7 electrolysis electrode structure within the FIG. 5 cage;

FIGS. 14A-14H show example graphs of results.

DETAILED DESCRIPTION OF EXAMPLE NON-LIMITING EMBODIMENTS

Figure 1:
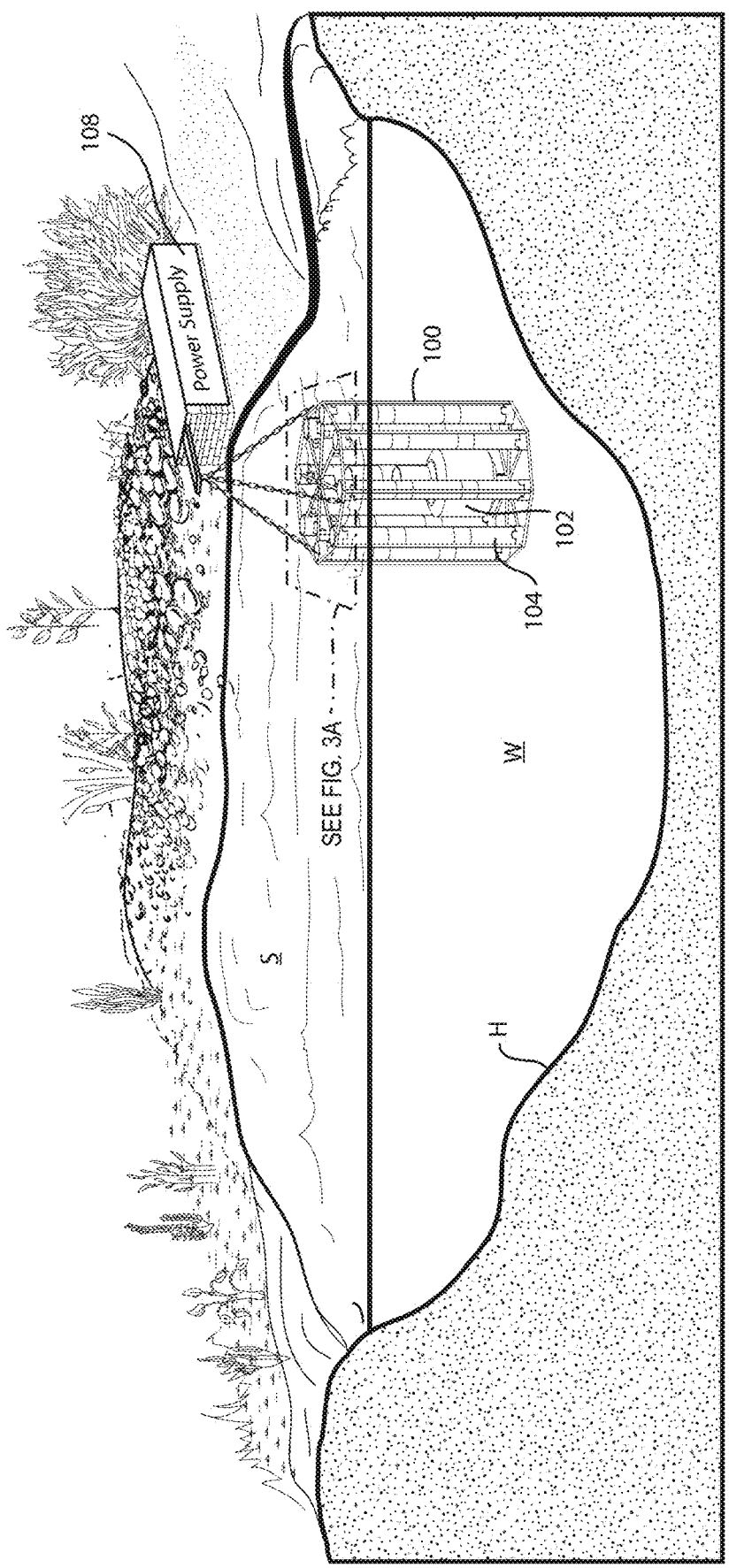
FIG. 1 shows an example non-limiting cleaning apparatus.

Aspects of the technology herein provide a device that can be placed into a polluted pond or holding tank and powered with clean energy, such as electricity, to clean the water by extracting the impurities and pollutants. FIG. 1 shows such a device in the form of an example non-limiting embodiment of a cleaning apparatus 100 suspended and immersed within liquid container H.

In the example shown, container H could be a pond, runoff container, tank, waterway, ocean, lake, stream, river, creek, ditch, run, pool, estuary, marsh, well, or any other water-containing structure. It can contain fresh water, brackish water, sea water, sewage, industrial runoff such as stickwater, or other fluids or liquids.

Disclosure of liquids and/or fluids and/or gels such as wastewaters that can be used/treated:

In the discussion herein, "water" (W) is all encompassing of the provided embodiments, unless otherwise indicated by context in the application. Such "water" (W) includes produced water, flood water, stream water, pond water (e.g., tailings pond water), industrial effluent, wastewater (e.g., industrial wastewater), or other suitable fluid. In particular embodiments, the "Water", "W", "wastewater" refers to water containing coal ash.

"Wastewater" water containing dissolved and suspended contaminants Wastewater comes in many forms:

Wastewater can be sewage in the form of human or non-human waste, effluents from, for example, food processing and canning operations, runoff from mining operations, radioactive wastes, hazardous wastes, or industrial waste from manufacturing operations. "Wastewater" as used herein means any such water based industrial, human, non-human, and heavy metal wastewater (e.g., industrial heavy metal wastewater).

Industrial wastewater may contain for example, dissolved concentrations of heavy metals, for example iron, manganese, copper, tin, lead, nickel, mercury, zinc, and cadmium.

heavy metal wastewater: a liquid or solution containing coal ash (e.g., coal fly ash, bottom ash, boiler slag, flue gas, and/or any combination thereof) and/or mine wastewater.

any electrolyte, i.e., a liquid or gel that contains ions and can be decomposed by electrolysis.

Other liquids such as alcohols, crude oil, or fractional products thereof, and other industrial or other liquid byproducts are also possible.

Cleaning apparatus 100 is shown suspended within liquid, fluid and/or gel such as water W so it is at least partly immersed or submersed. In other arrangements, the cleaning apparatus 100 could be resting on the bottom of the pond, tank, riverbed or other container or it could be supported on pylons or some other raised support arrangement within the fluid. In still other possible embodiments, the cleaning apparatus 100 could be supported by floats or other buoyant structures, or supported and/or pulled by a water craft, aircraft or other device below, on or about the surface C. In preferred non-limiting embodiments, apparatus 100 is supported in such a way that fluid can circulate through and around the apparatus. In still other embodiments, the apparatus 100 or components thereof can be enclosed within a pipe or other passageway through which fluid flows, providing a continuous cleaning operation with respect to a stream of contaminated fluid flowing through the pipe or other passageway.

Cleaning apparatus 100 can thus be either stationary or moveable, depending on requirements or applications. The dimensions of cleaning apparatus 100 can vary depending upon requirements such as fluid volume.

Reaction Volume Size:

In some embodiments, the reaction volume is 0.1 to 100,000, 1 to 10,000, 10 to 5,000 gallons, or 100 to 2,500 gallons, 150 to 1,000 gallons, or 200 to 750 gallons, or about 200 to 250 gallons.

Electrical Power

In the example shown, cleaning apparatus 100 is connected to an electrical power supply 108. Power supply 108 selectively supplies electrical power to cleaning apparatus 100. The electrical power can be derived from any power source(s) such as power mains, solar panels, hydroelectric generators, wind powered generators, fuel cells, batteries, or the like. In one example non-limiting embodiment, power supply 108 provides low voltage direct current such as for example 5 or 6 or 9 or 12 or 15 VDC at high current such as 60 or 120 amps through the use of an electrical AC stepdown transformer, a semiconductor rectifier diode, and DC inductive and/or capacitive filtering components such as capacitors and/or chokes.

In one example operating mode, cleaning apparatus 100 includes one or more electromagnets 102 that, when supplied with electrical current, produce a magnetic field(s). In another operating mode, power supply 108 supplies electrical current to electrolysis electrodes 104 that cause the fluid, liquid or gel to undergo an electrolysis electrochemical oxidation/reduction reaction, for example in the case of water W:

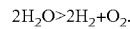

$$2H_2O > 2H_2 + O_2.$$

Figure 3A:
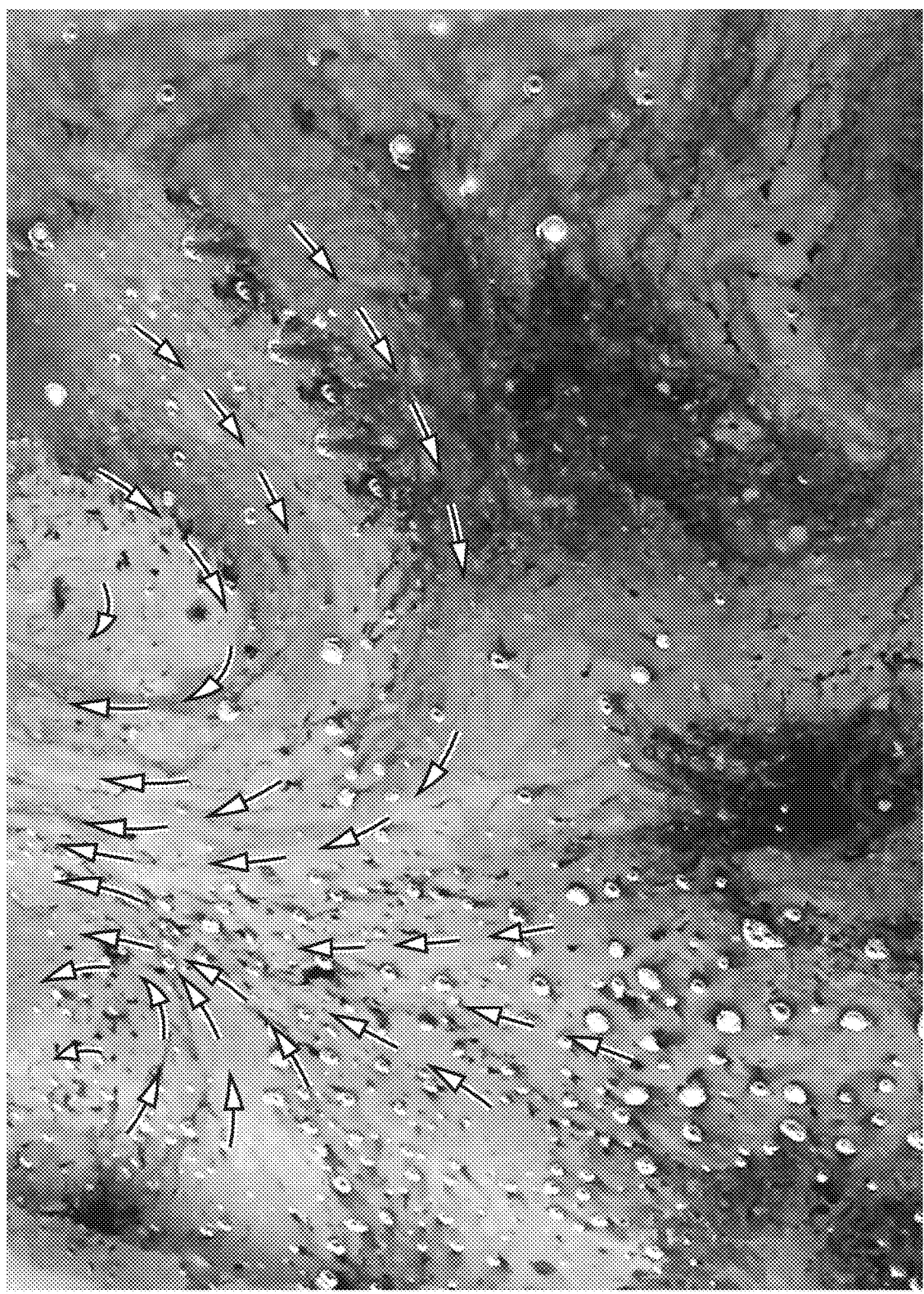
FIG. 3A shows an example non-limiting surface circulation produced by the FIG. 1 apparatus.
Figure 3B:
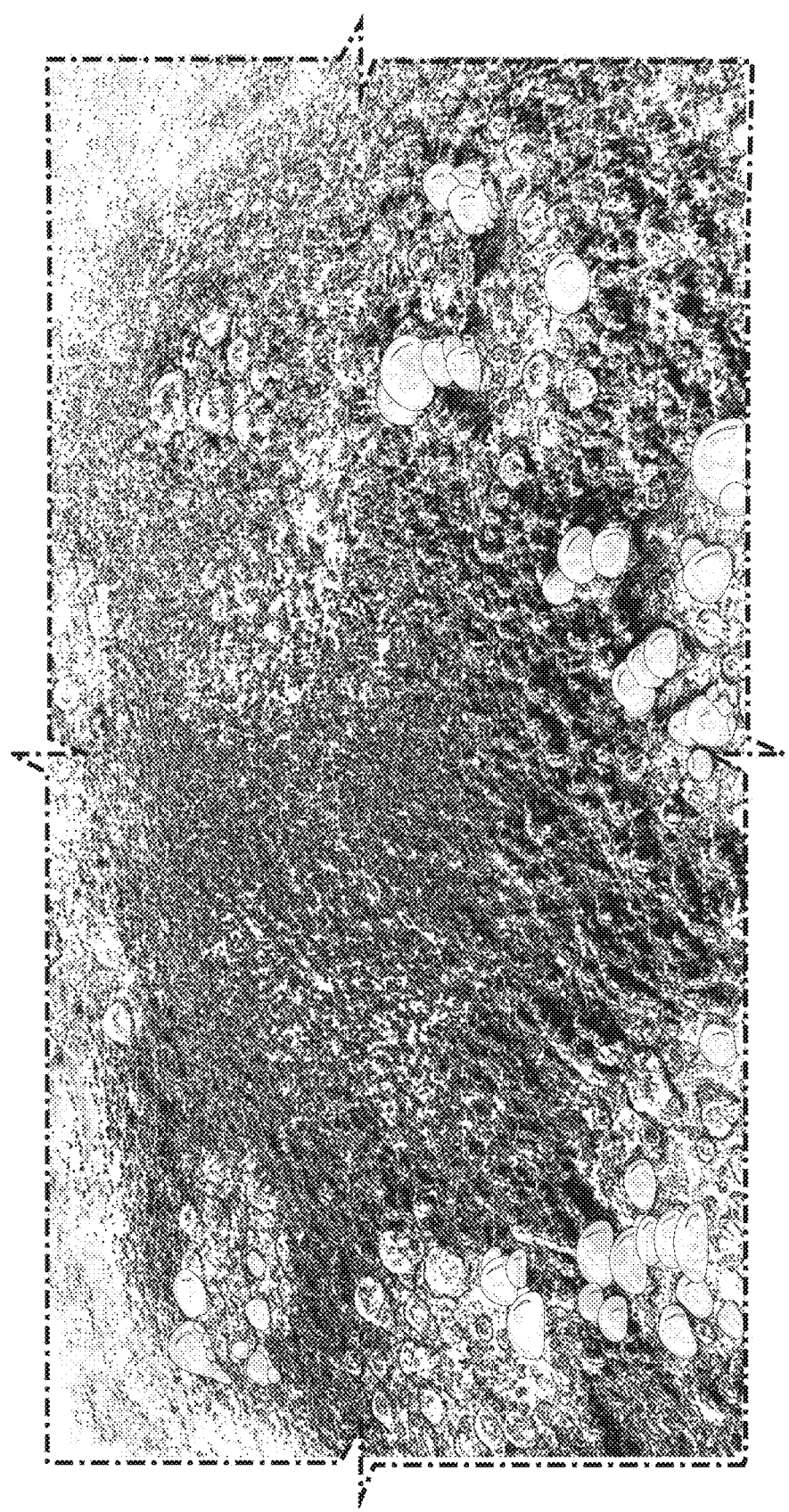
FIG. 3B shows an example non-limiting surface slurry produced by the FIG. 1 apparatus.

Thus, when power supply 108 supplies electrical current to the electrolysis electrodes 104, the cleaning apparatus 100, in one particular example, separates water W into hydrogen gas and oxygen gas, which may bubble up from the depths of the water W to the surface S as shown in FIGS. 3A, 3B.

Example Non-Limiting Process

Figure 2A:
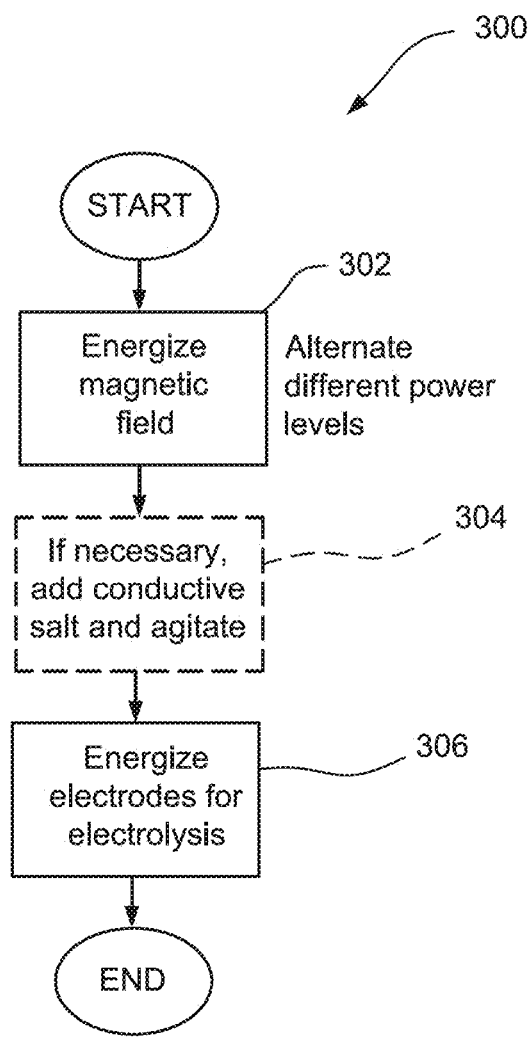
FIG. 2A shows an example non-limiting cleaning process.
Figure 2B:
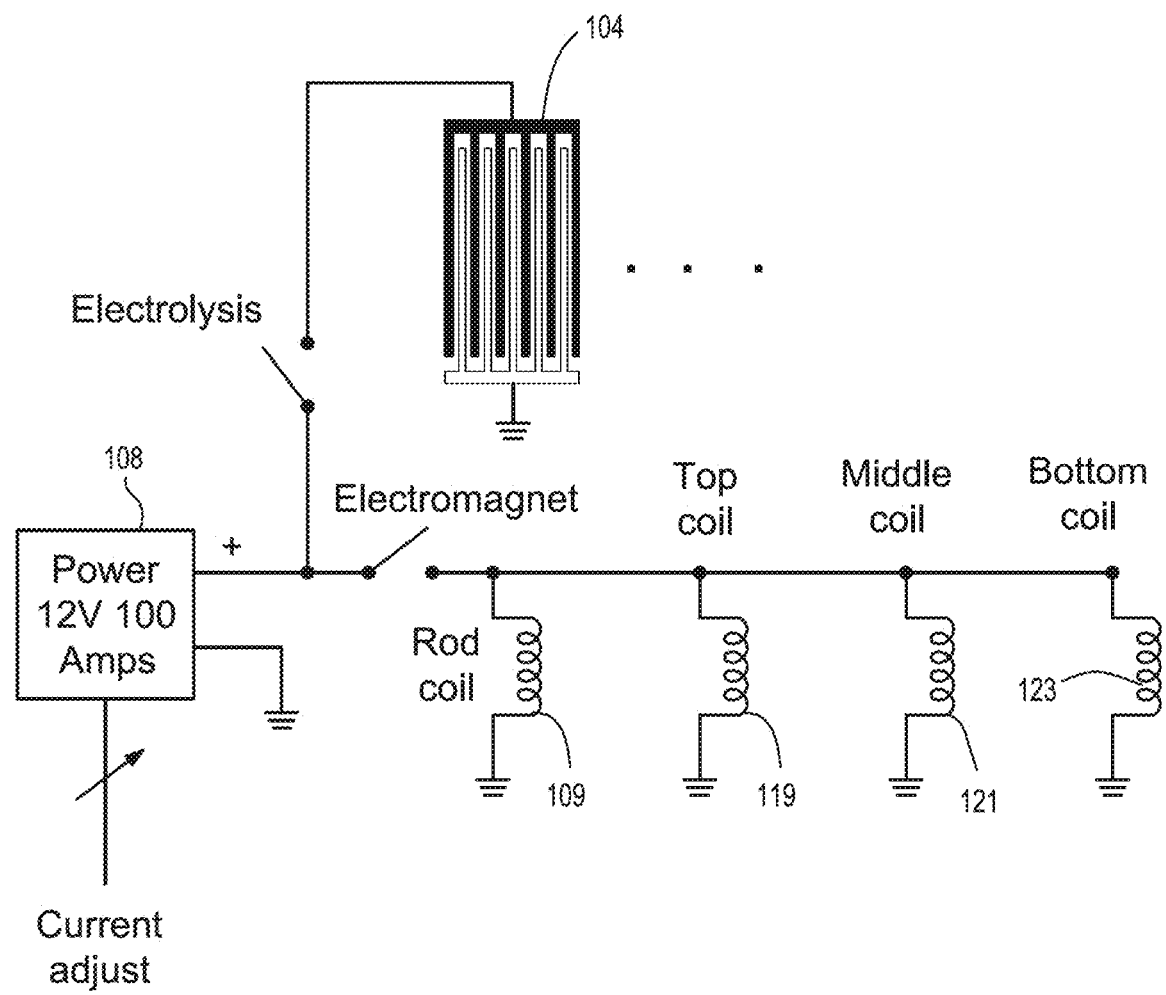
FIG. 2B shows an example non-limiting electrical diagram of an example cleaning apparatus.

FIG. 2 shows one non-limiting example operating protocol or process 300 for cleaning apparatus 100, and FIG. 2A shows an example non-limiting electrical block diagram including two switches and a DC current level adjustment. In a particular non-limiting operating mode shown, the power supply 108 energizes electromagnets 102 to produce a magnetic field (block 302). In one particular non-limiting embodiment, the power supply 108 alternates different voltage/current/power levels to expose water W to magnetic fields of different magnetic field strengths. In the example show, an e.g., 12 volt DC 100-amp power supply 200 is alternately connected to either electromagnets 104 (which may comprise multiple electromagnets 109, 118, 120, 122), or to the electrolysis electrodes 104.

One result of such magnetic field energization is to permanently magnetize certain metals within water W including for example ferromagnetic or paramagnetic particles in or carried by the water W. In particular, some types of coal ash contain a substantial percentage of ferromagnetic particles. It is desirable to remove/extract such ferromagnetic particles from the water W. These ferromagnetic particles may be attracted to a magnetic field or, if exposed to a strong magnetic field for a sufficient period of time, will magnetize and themselves become permanent magnets. Such high ferromagnetic content of coal ash can be observed by conducting a simple experiment: add coal ash to water in a clear tube and agitate. After a few minutes, most of the coal ash will settle to the bottom of the tube. Then bring a strong rare earth magnet into proximity with the tube. The rare earth magnet will attract and retain ferromagnetic material within the coal ash, separating the ferromagnetic material from the non-ferromagnetic components of the coal ash. Permanently magnetizing such ferromagnetic material may cause the individual particles to clump or flocculate.

In some cases, water W may be agitated before or during the magnetizing step 302 to circulate water W through the cleaning apparatus 100. In other example non-limiting modes of operation, the magnetic field and/or possibly heat produced by electromagnets 102 may cause circulation of water W or at least ferromagnetic and/or paramagnetic particles disposed with the water W.

The effect of the magnetic field produced by step 302 is not limited to magnetizing ferromagnetic and/or paramagnetic particles suspended in water W. In particular, as will be explained below, in some example non-limiting embodiments, the electromagnet 102 produces a magnetic field gradient that may have a significant and measurable effect on water W and/or its suspended or in-solution components. With the magnetic field turned on, one can observe a circulation of water W or at least the circulation of suspended ferromagnetic or paramagnetic particles that are within or flowing through cleaning apparatus 100. Specifically, in some disclosed non-limiting applications, the magnetic field can cause observable vortices, recirculating currents and/or other currents to form within the water W.

Different or various circulation rates and/or different or various circulation directions may be observed when the current that power supply 108 applies to electromagnet 102 is varied. The observed vortices or other currents or fluid motion may be circulation of suspended ferromagnetic or paramagnetic particles within the magnetic field.

The magnetic field could have other effects on the water W and/or materials and/or particles within the water. See for example, Virgen et al, "Removal of Heavy Metals Using Adsorption Processes Subject to an External Magnetic Field" (http)://dx.dio.org/10.5772/intechopen.74050); Lin et al, "The effect of magnetic force on hydrogen production efficiency in water electrolysis", Fuel and Energy Abstracts 37(2) (January 2012); Lin et al, "Effect Of Lorentz Force On Hydrogen Production In Water Electrolysis Employing Multielectrodes", Journal of Marine Science and Technology, Vol. 24, No. 3, pp. 511-518 (2016); Ni'am et al, "Combined Magnetic Field and Electrocoagulation Process for Suspended Solid Removal from Wastewater", Proceedings of the 1st International Conference on Natural Resources Engineering & Technology 2006 384-393; 24-25th (July 2006, Putrajaya, Malaysia) Zaidi et al, "Magnetic Field Application and its Potential in Water and Wastewater Treatment Systems", Separation & Purification Reviews 43:206-240, (2014); US20160045841A1; WO2013144664.

Example Addition of Electrolyte

Referring once again to the FIG. 2 example non-limiting operating process, once the magnetic field has been energized for a period of time (the duration and intensity of which may vary depending upon the application or other factors), the magnetic field may be deactivated (in other embodiments, the magnetic field may remain activated). Then (as before), if necessary or desirable, a conductive salt may be added to water W. The water may be agitated to cause the conductive salt to dissolve within the water W (block 304), thereby forming an electrolyte. The formation of electrolyte(s) enables the water W to conduct electrical current and undergo electrolysis. Generally speaking, an electrolyte is a liquid or gel that contains ions and can be decomposed by electrolysis. Generally speaking, electrolysis is a technique that uses electric current such as a direct electric current (DC) to drive an otherwise non-spontaneous chemical reaction, and more particularly, is a type of electrochemical reaction that uses electrical energy to cause nonspontaneous oxidation-reduction ("redox") reactions involving a transfer of electrons between two species to occur.

Water is an effective solvent for many ionic compounds. For example, solutions containing dissolved salts are typically electrolytes. Generally speaking, one particular kind of electrolyte is a substance whose aqueous solution contain ions (i.e., positively and negatively charged particles). The ionic chemical compound is composed of ions held together by electrostatic forces termed ionic bonding. The ionic compound is electrically neutral, but is formed of positively charged ions called cations and negatively charged ions called anions. The positively charged ion is called a cation because it is attracted to a negatively charged electrode called a cathode, and the negatively charged ion is called an anion because it is attracted to a positively charged electrode called an anode. The ions can be single atoms (e.g., Na+ and Cl−) or they can comprise multiple atoms. The ions can be monovalent (e.g., Na+ and Cl−) or they can be multivalent (e.g., $Mg^{2+}$, $Mn^{2+}$, $CA^{2+}$, $Al^{3+}$, $Fe^{2+}$, $Fe^{3+}$, and $CO_3^{-2}$).

In some embodiments, added electrolyte is a magnesium salt: magnesium oxide, magnesium hydroxide, magnesium alkoxide, magnesium acetate, magnesium carbonate, magnesium chloride, or magnesium sulfate. In particular embodiments, the magnesium salt is magnesium sulfate.

In some embodiments, added electrolyte is a salt selected from $Al_2(SO_4)_3$, $FeCl_3$, $Fe_2(SO_4)_3$, and polyaluminum hydroxychloride ($Al_nCl_{(3n-m)}(OH)_m$).

When an ionic compound dissolves in the water, the ions become surrounded by $H_2O$ molecules, and the ions are said to be solvated. The solvation process helps stabilize the ions in solution and prevents the cations and anions from recombining Because the ions are free to move about, the ions typically become dispersed uniformly or fairly uniformly throughout the solution.

In some embodiments, the reaction volume may comprise any acid, base, or salt that disassociates in Water into cations and anions, provided that the disassociated cation has less standard electrode potential than a hydrogen ion to ensure production of hydrogen gas during electrolysis. Concentration of electrolytes in the reaction volume of the electrolyte solution contains a sufficient concentration of ions to conduct electricity and to carry out electrolysis in the provided apparatus.

Salts that produce hydroxide OH− ions when dissolved in water are called alkali salts. Salts that produce acidic solutions (H+ ions) are called acidic salts. Neutral salts are those salts that are neither acidic nor basic.

In one example non-limiting embodiment, magnesium sulfate (MgSO4), otherwise known as Epsom salts, is added to water W. At 20 degrees C., the solubility of MgSO4 is 35.1 g MgSO4 in 100 mL H2O, or 351 g in 1 Liter of H2O. The formula mass of MgSO4 (anhydrous) is 120.366 g/mol. 1.25 moles of MgSO4 will have a mass of 1.25 moles/Liter× 120.66 g/mole=150.456 g/Liter MgSO4. However, it is not necessary to make a saturated solution. In one example embodiment, only a sufficient quantity of this salt is added to make the water sufficiently conductive to support efficient electrolysis. In aqueous solution, MgSO4 dissociates into Mg2+ ions and (SO4)2− (sulfate) ions. Because sulfate is difficult to oxidize, it does not compete with the production of hydrogen gas at the anode during electrolysis.

In other example non-limiting embodiments, the water W may already (before treatment) contain sufficient conductive salt to sustain electrolysis. For example, if water W is sea water or brackish water, it may already contain sufficient amounts of conductive salts and/or electrolytes to support electrolysis. For example, sea water typically contains Sodium chloride (NaCl), Sodium sulfate (Na2SO4), Potassium chloride (KCl), Sodium bicarbonate (NaHCO3), Potassium bromide (KBr), Boric acid (H3BO3), Sodium fluoride (NaF), Magnesium chloride (MgCl2), Calcium chloride (CaCl2) and Strontium chloride (SrCl2). See e.g., ASTM D1141-98. In other embodiments, any electrolyte, either inorganic or organic, may also be used.

List of potential alternative salts/electrolytes that can potentially be used with the disclosed apparatus and according to the disclosed methods include:

In some embodiments, the electrolyte comprises a salt of aluminum (e.g., aluminum sulfate or "alum", aluminum chloride, or poly aluminum chloride), iron (e.g., carbonates, chlorides or sulfates), calcium (e.g., carbonates, chlorides or sulfates), sodium (e.g., carbonates, chlorides or sulfates), or a mixture thereof.

In preferred embodiments, the electrolyte is strong (that is, ionizes substantially completely upon dissolution). Non-limiting examples of strong electrolytes include HNO3, HClO4, H2SO4, HCl, HI, HBr, HClO3, HBrO3, alkali hydroxides, alkaline earth hydroxides (e.g., calcium hydroxide) and most salts (e.g., calcium carbonate, calcium chloride and sodium chloride). In some embodiments, the electrolyte is selected from sodium hydroxide, sodium sulphate, calcium chloride, sodium chloride, calcium hydroxide and mixtures thereof. In one embodiment, electrolyte comprises salt water. The salt water may be formulated, or it may be taken directly from a large body of naturally occurring salt and/or brackish water. In some embodiments, the electrolyte is preferably sodium carbonate. The electrolyte may be added in any suitable form.

Example Electrolysis

In electrolysis, two electrodes (an anode and a cathode) are immersed into the electrolyte (e.g., an aqueous electrolytic solution) and a source of direct current is applied across the electrodes (the negative side of the supply is connected to the cathode and the positive side of the supply is connected to the anode). In the electrolysis of aqueous solutions, water may be oxidized to form oxygen gas ($O_2$) and/or reduced to form hydrogen gas ($H_2$). The rate of this "redox" reaction may depend on factors including pH, concentration, temperature and other effects. See e.g., van der Niet et al, "Water dissociation on well-defined platinum surfaces: The electrochemical perspective", Catal. Today 202 (2013) 105-113; Shen et al, "A concise model for evaluating water electrolysis" International Journal of Hydrogen Energy, 36 (2011) 14335-14341; Rossmeisl et al "Electrolysis of water on (oxidized) metal surfaces", Chemical Physics, 319 (2005) 178-184; www1.lsbu.ac.uk/water/electrolysis.html.

The generation of hydrogen gas may form hydroxides, which are known to be efficacious for removing heavy metals from wastewater. See for example Ayers et al "Removing Heavy Metals from Wastewater," Engineering Research Center Report (August 1994). Generally speaking, molecular hydrogen ($H_2$) is a neutral molecule which, when dissolved in water, has no influence on the water's pH. Methods of producing hydrogen water such as bubbling or infusing, which simply add pure hydrogen gas to water, do so without changing the original pH of the water. Additionally, rising hydrogen gas bubbles may have the effect of levitating particles in the water W to the surface S, where they can be skimmed or otherwise removed.

As shown in FIG. 2, once the water W is sufficiently conductive to support electrolysis, power supply 108 energizes the electrodes 104 to begin electrolysis (block 306). Electrolysis causes the water W to break down into its elemental components (hydrogen gas and oxygen gas), which bubble up to the surface S of water W as shown in FIG. 3A. Because of the configurations of the particular electrolysis electrodes 104, one may observe circulation on the surface S of water W around each set of electrolysis electrodes 104.

As electrolysis proceeds, water currents circulate through cleaning apparatus 100. These water currents are produced at least in part by the bubbling of oxygen and hydrogen gas as the bubbles float to the surface S and are released into the atmosphere (in some embodiments these gases can be captured).

As the electrolysis chemical reaction supported by electrodes 104 proceeds, a slurry such as shown in FIG. 3B begins to develop on the surface S of water W. The slurry may contain some material from the coal ash. In one embodiment, the levitation of coal ash materials to the surface S is significant. As time passes, the slurry on the surface S may become thicker and develop a thickness of, for example, one or a few inches. The slurry floats on the surface S from which it may be skimmed and removed. Meanwhile, rare earth magnets disposed at or near the top of the apparatus 100 may attract and retain ferromagnetic or other particles, some of which were magnetized by the magnetic field.

In the case of electrolysis using magnesium sulfate ($MgSO_4$) as the salt, $Mg^{2+}$ ions will be reduced at the cathode to magnesium metal. The magnesium will react with water to produce $H_2$ gas and form $Mg(OH)_2$, a strong but not very soluble base. The pH is therefore expected to increase near the cathode. The $H^+$ concentration due to the slight acidity of $MgSO_4$ is quite small but any $H^+$ which is removed by being turned into $H_2$ gas results in the same effect: the pH increases at the cathode. At the anode, $SO_4^{2-}$ anions are oxidized, $O^2$ is produced and the sulfate ion is converted into $SO_3$ and hydrates to $H_2SO_4$ (sulfuric acid). The pH at the anode is therefore expected to decrease as sulfuric acid is formed. However, upon agitation/mixing the products of the cathodes and anodes, the $H_2SO_4$ is expected to react with the $Mg(OH)_2$ to again produce $MgSO_4$. The result is no significant expected change in pH and conversion of water into hydrogen gas and oxygen gas. If the electrolysis continues long enough, the decrease in the quantity of water (which the electrolysis converts to gas) will cause magnesium sulfate to become more concentrated, which will decrease the pH because magnesium sulfate is acidic and soluble in water.

Example Non-Limiting Test Results

A result of the described processes causes the water W remaining within the water holding structure to become clean (or relatively clean) and free (or relatively free) of material that was formerly dissolved or suspended within the water. After operating for a sufficient period of time that may depend upon the size of the cleaning apparatus, the amount of water W within the holding structure H and other factors, the water W remaining in the holding structure will become purified or relatively purified, or meet the standard of identity for purified or drinkable water. See for example the standards of the Environmental Protection Agency under the Safe Drinking Water Act (SDWA), information about which can be found at https://www.epa.gov/gov/dwreginfo/drinking-water-regulations and 40 Code of Federal Regulations (CFR) Section 141 et seq. One purpose of the apparatuses and methods described herein is to treat wastewater so it complies or substantially complies with such regulations, i.e., to become drinkable or potable. Another purpose of the apparatuses and methods described herein is to treat wastewater so it becomes subpotable, and/or otherwise able to be reused for other purposes. The apparatuses and methods described herein can be used in combination with other techniques (e.g., ultraviolet light, sanitizing or other chemical treatment, filtration, etc.) to achieve particular desired results.

As one non-limiting illustrative example, the following Table I shows concentration of certain metals before and after cleaning apparatus 100 cleans a certain quantity of water W into which coal ash has been added (see also FIGS. 14A-14F):

TABLE I

| Metal | Concentration Before Treatment (mg/L) | Concentration After Treatment (mg/L) |
| --- | --- | --- |
| Silver (Ag) | 0.265 | 0.101 |
| Arsenic (As) | 62.00 | <0.02 |
| Barium (Ba) | 184.00 | 1.63 |
| Cadmium (Cd) | 0.910 | <0.002 |
| Chromium (Cr) | 11.500 | <0.002 |
| Mercury (Hg) | 0.61 | 0.06 |
| Lead (Pb) | 13.00 | <0.01 |
| Selenium (Se) | <2.4 | <0.2 |

Heavy metals (any metallic chemical element that has a relatively high density and is toxic or poisonous at low concentrations) and rare earth elements (one of a set of seventeen chemical elements in the periodic table, specifically the fifteen lanthanides, as well as scandium and yttrium) that can be extracted/recovered according to the disclosed methods:

Ag, As, Ba, Cd, Cr, Hg, Pb, and Se.

Heavy metals: exemplary heavy metals include: Cr, Co, Cu, Pb, Mn, Ni, Zn, Hg, Ag, and As.

Rare earth elements: exemplary rare earth elements, include: lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), scandium (Sc) and yttrium (Y). Exemplary light rare earth elements include Sc, La, Ce, Pr, Nd, and Pm. Exemplary medium rare earth elements include Sm, Eu, and Gd. Exemplary heavy rare earth elements include Tb, Dy, Ho, Er, Tm, Yb, Lu, and Y.

Rare earth elements recovered or extracted according to the disclosed methods have numerous uses for example, in aerospace components, high refractive index glass, flint, batteries, catalysts, polishes, lasers, x-ray machines and capacitors, fluorescent light bulbs, and permanent magnet motors in hybrid vehicles, wind turbines, and computer disk drives.

Example Non-Limiting Electromagnets

Figure 4:
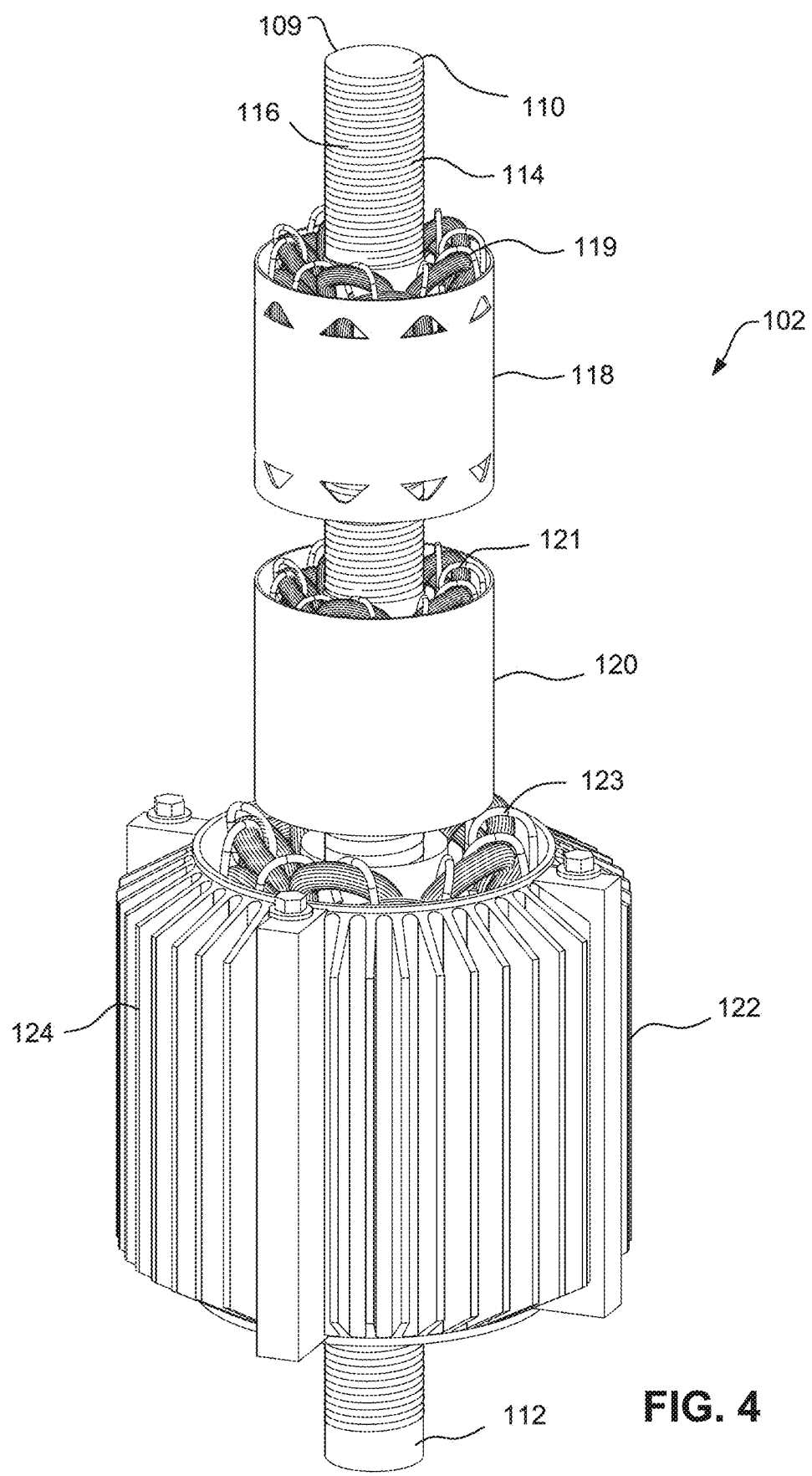
FIG. 4 shows an example non-limiting electromagnet stack portion of the FIG. 1 apparatus.

FIG. 4 shows an example non-limiting electromagnet stack 102 an example non-limiting embodiment uses to generate a magnetic field. As shown in FIG. 4, electromagnet stack 102 comprises four main parts:

a ferromagnetic rod electromagnet 109;
an upper stator field coil winding assembly 118;
a middle stator field coil winding assembly 120; and
a lower stator field coil winding assembly 122.

Figure 4A:
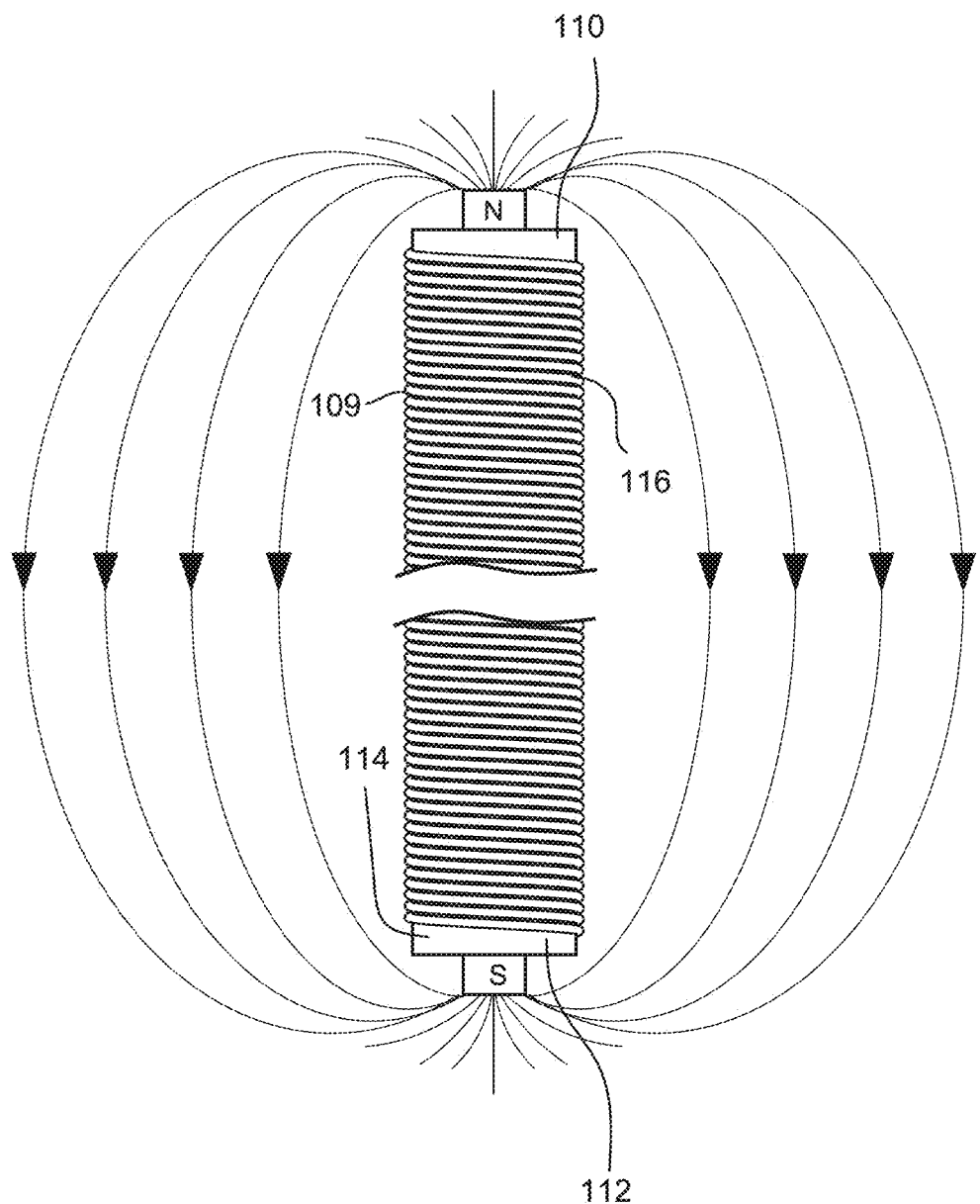
FIG. 4A shows an example rod electromagnet.

FIG. 4A illustrates central ferromagnetic rod electromagnet 109, which may consist of or comprise an elongated iron cylindrical rod 111 onto which many coils of an insulated copper wire 116 have been wound. As is well known, such a long length of copper wire wound as shown generates a nearly uniform magnetic field similar to a bar magnet when DC current flows through the winding.

FIG. 4A shows that this rod electromagnet 109 provides an elongated solenoid winding 116 outside of a ferromagnetic core. One example non-limiting implementation uses 2600 feet of 16-gauge insulated wire to form approximately 5600 uniform wraps of wire around a cylindrical iron rod. It is possible to derive the strength of the magnetic field of this rod electromagnet 109 using ampere's law:

$$B = \mu n I$$

where B is the magnetic field, n is the number of turns, I is the current flowing through the solenoid, and $\mu$ is a constant defining the permeability of free space. Thus, the magnetic field B in the ferromagnetic core 111 of this solenoid is directly proportional to the product of the current flowing around the solenoid and the number of turns per unit length of the solenoid.

The magnetic field is very strong at each end or pole 110, 112 of the electromagnet 109, but is relatively weak immediately outside of or on the surface of the winding 116. The magnetic lines of force the solenoidal winding produces are channeled through the ferromagnetic core 111 and primarily extend from one (e.g., N) pole 110 to the other (e.g., S) pole 112.

Referring again to FIG. 4, in one example non-limiting embodiment, the upper winding assembly 118, middle winding assembly 120, and lower winding assembly 122 each comprise stator field coil assemblies of conventional AC induction motors with their armatures removed. Thus, the upper winding assembly 118 constitutes the stator field coil of a smaller AC induction motor, the medium winding assembly 120 constitutes the stator field coil winding of a medium sized AC induction motor, and the lower winding assembly 122 comprises the stator field coil windings of a larger AC induction motor. In one example non-limiting embodiment, the upper winding assembly 118 is the stator of a ½ HP single phase AC induction motor; the middle winding assembly 120 is from a 2.5 HP single phase AC induction motor; and the lower winding assembly 122 is the stator from a 15 HP three-phase AC induction motor. The end bells of the motors have also been removed in this embodiment, leaving only the motor stator and its associated housing.

In this non-limiting embodiment, these stator assemblies 118, 120, 122, while designed to operate in air, are instead completely immersed in water W. The water W removes heat from the stators when they are energized by a DC current. As FIG. 4 shows, the lower motor 122 housing includes cooling fins 124 which remove excess heat and increase the surface area over which the heat can be dissipated in the surrounding water. In one example non-limiting implementation, use of these stator assemblies that are designed to operate "dry" and are instead immersed in water provide unexpected results.

Figure 4B:
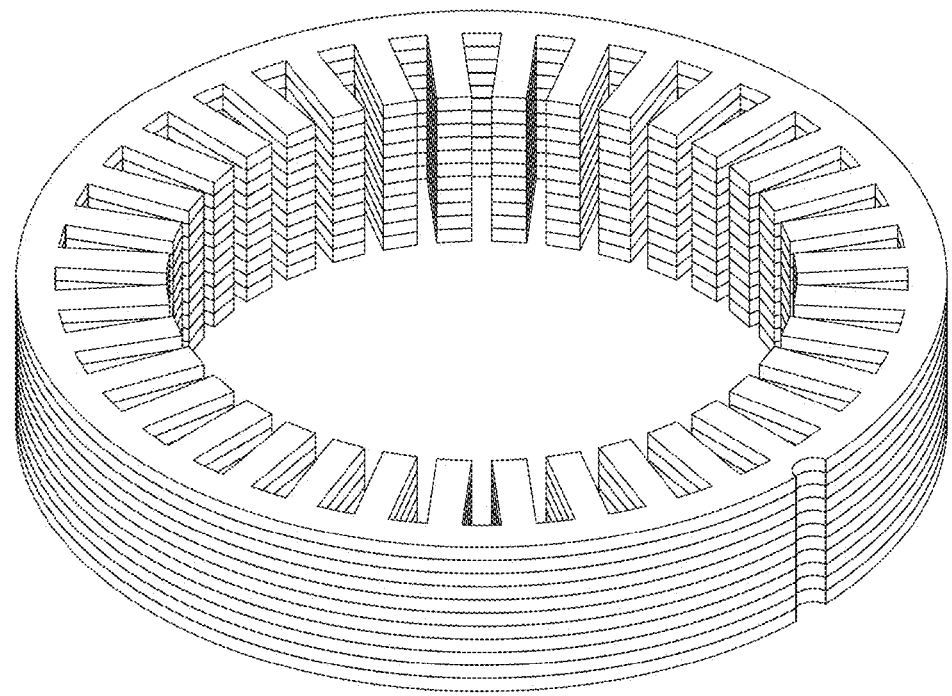
FIGS. 4B & 4C show an example non-limiting electromagnet stator field coil arrangement.

Typically, a stator core as shown in FIG. 4B comprises a stack of flat high alloy steel rings that are insulated from one another electrically. Each of motor stator field coil assemblies 118, 120, 122 includes a steel alloy "doughnut" comprising a plurality of planar ring-like steel alloy plates that are laminated together to form a composite ring of a certain thickness. The resulting laminated steel ring defines, within its inner circumference, a series of grooves or slots into which copper wire coils are laid as shown for example in FIG. 4C. Typically, some type of insulative material (not shown) such as plastic lines the grooves or slots so the insulation (often lamination) covering the copper wire does not get cut, preventing the copper wires from shorting to one another and/or to the stator doughnut.

Figure 4C:
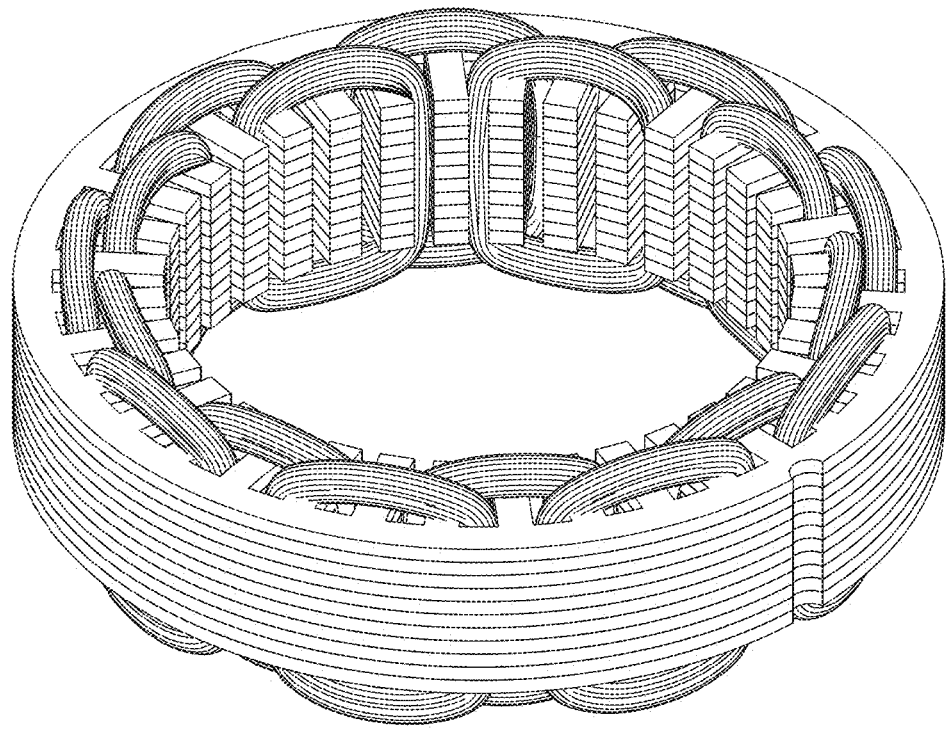

In the particular non-limiting implementation shown, since the stator assemblies 118, 120 began as single-phase induction motors, all of the windings 119 within each of these assemblies are wound in series to form a single long winding. FIG. 4C shows laminated copper wire wound around the stator core. Stator assemblies 118, 120, 122 thus each have windings comprising vertically-oriented winding runs and horizontally-oriented winding runs. The windings can comprise one long conductor or multiple conductors. As can be seen, the windings include horizontally-oriented winding runs that have the same vertical orientation as the rod windings 116 and vertically-oriented winding runs that lay in directions that are perpendicular to the direction of the rod windings 116. Since the stator windings are spaced about the circumference of the doughnut-shaped stator core, they provide plural different orientations (18 different orientations in the FIG. 4C non-limiting example, but other configurations are also possible) in directions orthogonal to horizontal and vertical. These orientations result in many magnetic field orientations and alternate magnetic polarities such as shown in the example FIG. 4D magnetic field model.

Figure 4D:
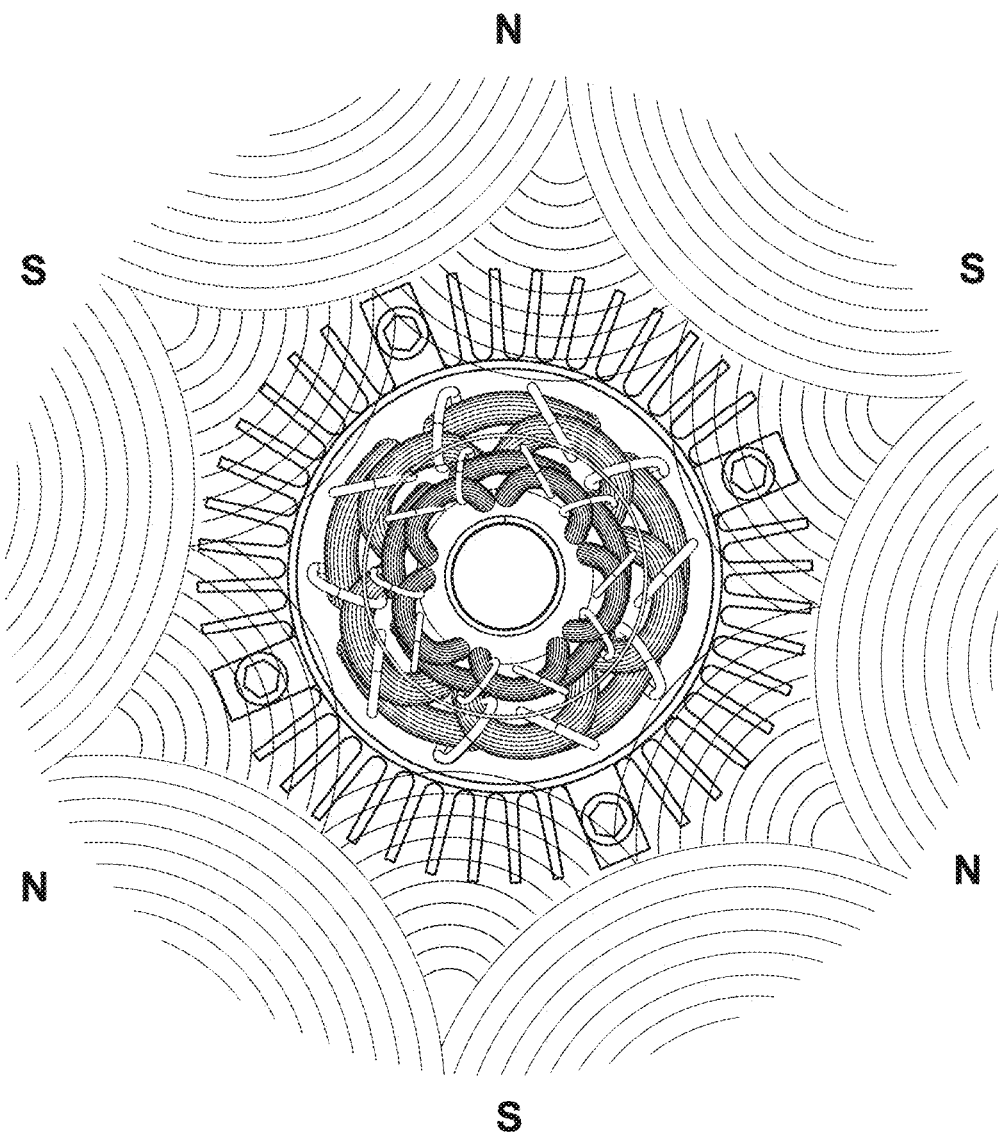
FIG. 4D shows an example non-limiting possible model of a magnetic field distribution pattern in one horizontal plane through or near the cleaning apparatus.

FIG. 4D shows that the winding is structured so that runs of the winding are spaced about the periphery of the stator core in successively rotated orientations. The FIG. 4D model also shows that the magnetic fields alternate from N to S as one progresses around the circumference of the electromagnet. This model may exist in a single plane or range of planes perpendicular to axis V. Other such planes cutting through the electromagnet stack may have different magnetic patterns depending on the number of poles of the particular electromagnet 118, 120, 122 and/or the relative rotational orientations of the different electromagnets within the stack. There is also a magnetic interaction between the magnetic field produced by the rod electromagnet 109 and the multi-pole circular magnets provided by stators 118, 120, 122. At least some cross-sections through the electromagnet stack may yield what may appear to be a "flower" shaped or multi-node pattern of FIG. 4D as plotted for example using polar coordinates.

In the particular example shown, the upper stators 118, 120 are from single-phased induction motors, whereas the stator 122 is from a three-phase induction motor. In one example embodiment, the three-phase motor from which field coil winding assembly 122 is obtained has a different winding configuration than the single-phase motors from which field coil winding assemblies 118, 120 are taken. In one example embodiment, the three-phase motor stator coil provides nine (9) leads to three different coils; these three coils are connected together (observing polarity and relative coil orientation) in one embodiment to provide a substantially uniform magnetic field around the coil when the (now unified) coil is connected to a direct current source to provide a multi-node flower-shaped (with respect to magnetic polarization and field strength) magnetic field pattern. In the example non-limiting embodiment, the three different windings of the three-phase motor 122 are electrically connected in parallel in one embodiment, although series connections are also possible. Connections are made to avoid overcurrents, and in some cases, saturation.

It is well known that an AC induction motor typically produces a stator magnetic field that rotates as the phase of the AC current changes. See for example Ho, S., "Analysis and design of AC induction motors with squirrel cage rotors", University of New Hampshire, Durham (Fall 1996); Alger, Philip L., The Nature of Polyphase Induction Machines. New York: John Wiley & Sons, Inc. (1951); Chan et al, "Analysis of Electromagnetic and Thermal Fields For Induction Motors During Starting," IEEE Transactions on Energy Conversion, Vol. 9, No. 1 (March, 1994), pp. 53-60; Trzynadlowski, Andrzej M., The Field Orientation Principle in Control of Induction Motors. Boston: Kluwer Academic Publishers (1994); Veinott, Cyril G., Theory and Design of Small Induction Motors, New York: McGraw-Hill Book Company, Inc., (1959). However, in the example non-limiting embodiments herein, the stator windings are fed a direct current rather than an alternating current, so there is no pulsating or rotation of the magnetic field and the magnetic field is instead static and constant. In other example non-limiting embodiments, the magnetic fields are varying and/or pulsating or alternating. Generally speaking, the strengths of the magnetic fields depend on the current/voltage of the current source, the number of windings, the gauge of the copper wire, the size and configuration of the core on which the windings are wound, the composition of the medium in which the windings are immersed, and other factors such as temperature.

In the particular implementation shown, the electromagnet stack 102 has more windings 123 near the bottom of the stack, and fewer windings 119 near the top of the stack. Accordingly, the electromagnet stack 102 produces a magnetic field gradient with higher magnetic flux near the bottom of the stack and lower magnetic flux near the top of the stack. Meanwhile however, there will also be a strong magnetic flux at the ends or poles of the rod electromagnet 109, such that magnetic lines of force will extend around the periphery of the stack 102 from the top 110 to the bottom end 112, just as in a conventional permanent bar magnet. See FIG. 4A. In other non-limiting embodiments, a uniform or substantially uniform magnetic field may be provided.

Magnetic Field Strength and Characterization:

In some embodiments, the cleaning apparatus forms a magnetic field of 200-5000, 300-3000, 400-2500, 500-2000, 600-1500, 800-1300 or 25-1300 Gauss. In preferred embodiments, the cleaning apparatus forms a magnetic field of 900-1250 Gauss or 975-1000 Gauss.

In some embodiments, the cleaning apparatus comprises a ferromagnetic rod electromagnet (e.g., 109) that forms a magnetic field of 200-4500, 300-3000, 400-2500, 500-2000, 600-1500, 800-1300 or 975-1000 Gauss.

In some embodiments, the cleaning apparatus generates an electromagnetic field gradient by an electromagnet stack. In some embodiments, the cleaning apparatus comprises a ferromagnetic rod electromagnet (e.g., 109) that forms a magnetic field of 200-4500, 300-3000, 400-2500, 500-2000, 600-1500, or 800-1300 Gauss or 975-1000 Gauss and further comprises a lower stator field coil winding assembly (e.g., 122). In some embodiments, the lower stator field coil winding assembly forms a magnetic field of 15-250, 25-200, 50-170, or 75-150 Gauss or 25-1300 Gauss.

In some embodiments, the cleaning apparatus generates a magnetic field gradient by a magnet stack comprising a ferromagnetic rod electromagnet, a lower stator field coil winding assembly, and another stator field coil winding assembly (e.g., 122). In some embodiments, the cleaning apparatus comprises a ferromagnetic rod electromagnet (e.g., 109) that forms a magnetic field of 200-4500, 300-3000, 400-2500, 500-2000, 600-1500, or 800-1300 or 975-1000 Gauss, a lower stator field coil winding assembly that forms a magnetic field of 15-250, 25-200, 50-170, or 75-150 Gauss, and an additional stator field coil winding assembly (e.g., 122). In further embodiments, the additional stator field coil winding assembly forms a magnetic field of 5-150, 10-100, or 25-75 Gauss.

In some embodiments, the cleaning apparatus generates an electromagnetic field by a magnet stack comprising a ferromagnetic rod electromagnet, a lower stator field coil winding assembly, and another stator field coil winding assembly (e.g., 122). In some embodiments, the cleaning apparatus comprises a ferromagnetic rod electromagnet (e.g., 109) that forms a magnetic field of 200-4500, 300-3000, 400-2500, 500-2000, 600-1500, or 800-1300 or 975-1000 Gauss, a lower stator field coil winding assembly that forms a magnetic field of 15-250, 25-200, 50-170, or 75-150 Gauss, a middle stator field coil winding assembly (e.g., 122) that forms a magnetic field of 5-150, 10-100, or 25-75 Gauss, and an upper stator field coil winding assembly (e.g., 118). In further embodiments, the upper stator field coil winding assembly forms a magnetic field of 1-100, 5-75, or 10-50 Gauss.

In some embodiments, the electromagnet stack may include one electromagnet, two electromagnets, three electromagnets, four electromagnets, or N electromagnets where N is any positive integer. In other embodiments, the stack may include a combination of one or plural permanent magnets and one or plural electromagnets. In still other embodiments, the stack can include any number K of permanent magnets and no electromagnets. While the disclosed stack produces a magnetic field gradient with a magnetic flux that can be changed, this is not limiting and other embodiments may provide a uniform and/or static magnetic field.

Example Cage Structure

Figure 5:
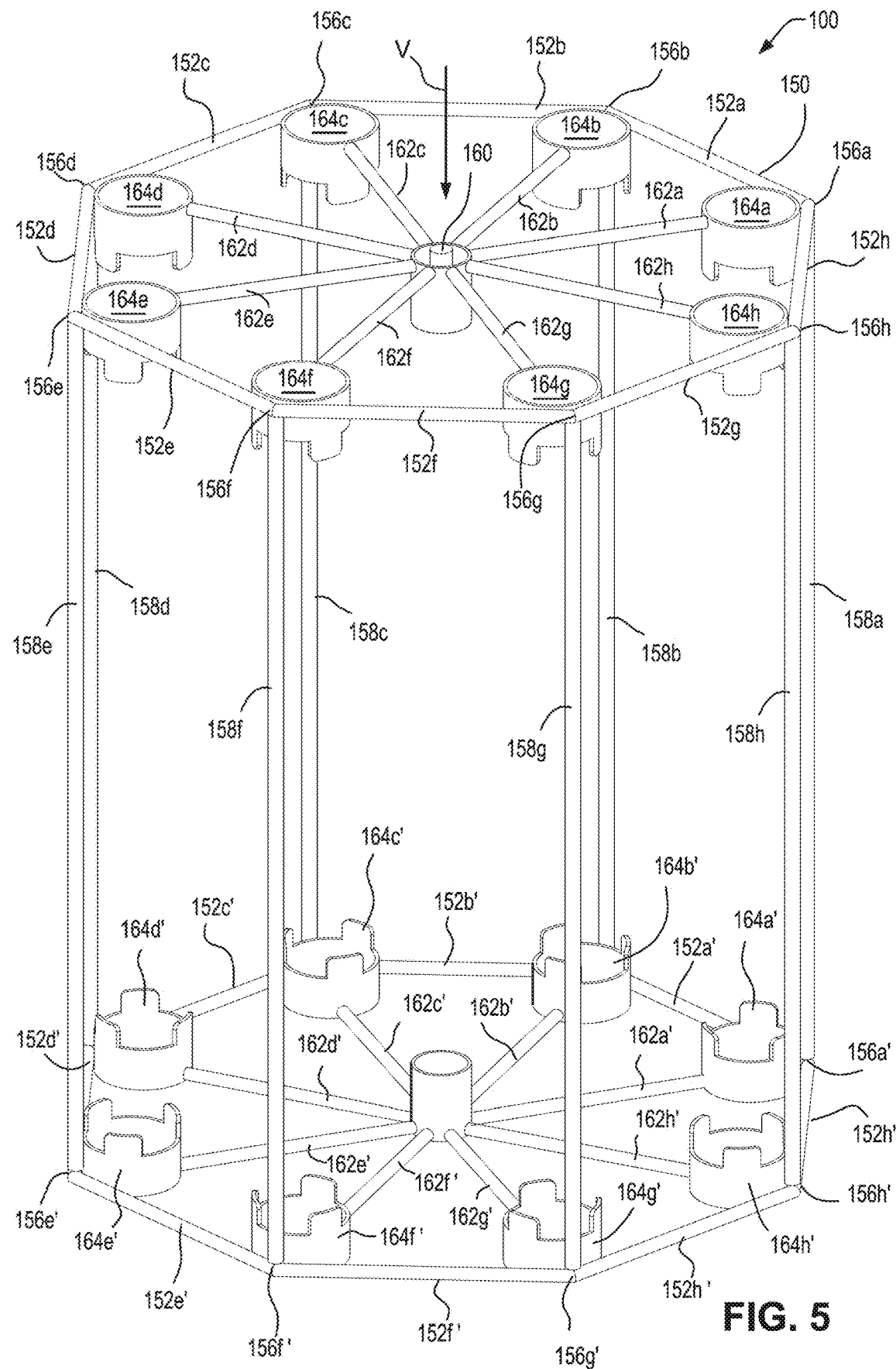
FIG. 5 shows an example non-limiting cage of the FIG. 1 apparatus.
Figure 10A:
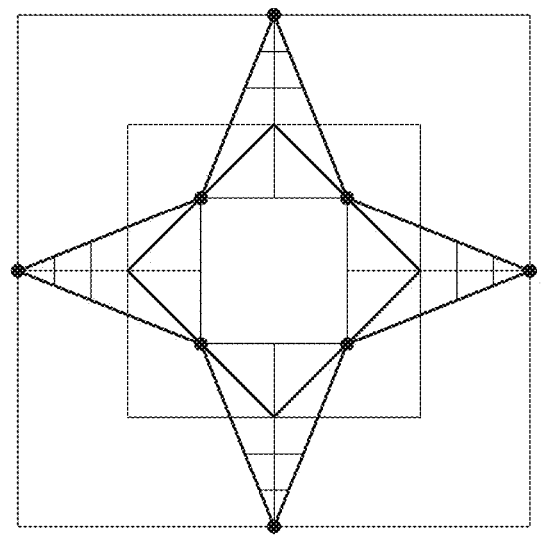
FIGS. 10A and 10B show example non-limiting alternative cage configurations.
Figure 10B:
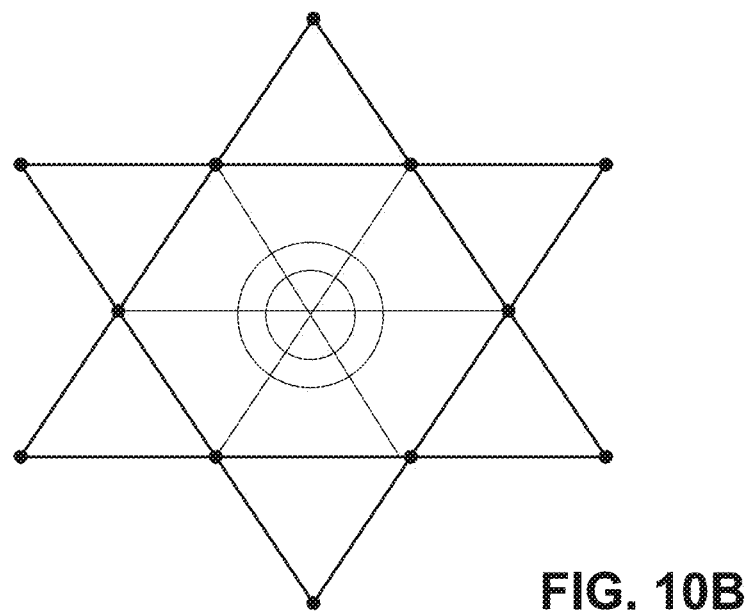

FIG. 5 shows a frame or cage 150 of cleaning device 100. In the particular example shown in FIG. 5, cage 150 is made of rugged material and adjoined together to provide a magnetically- and electrically-conductive rugged open enclosure. In some embodiments, the cage 150 is made of paramagnetic material such as iron, steel, cobalt, nickel or the like. In other embodiments, the cage could be made of non-conductive, non-ferromagnetic material such as carbon, graphite, or a plastic such as PVC. In the example shown, cage 150 is hexagonal in shape along axial viewing line V, but in other embodiments can have other configurations such as the star-shaped ones shown in FIGS. 10A, 10B for example.

Figure 11A:
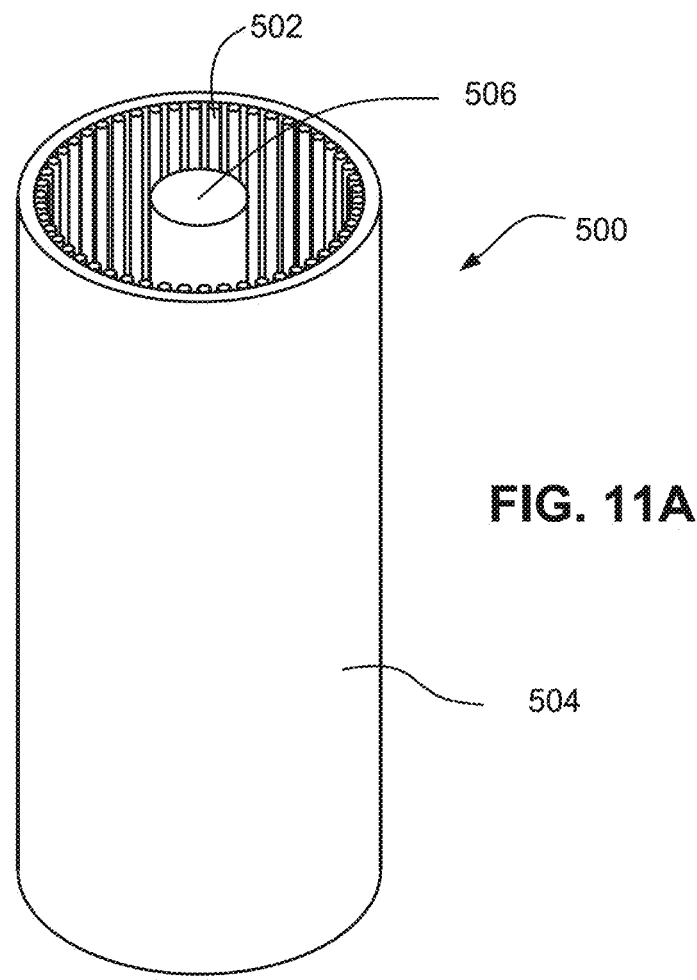
FIGS. 11A-11B show an alternative example configuration of an apparatus.

In one particular non-limiting implementation, cage 150 includes a top or upper open end portion 152 and a bottom or lower open end portion 154 each of which are shaped as an octagon, i.e., an eight-sided shape with all sides having equal lengths. At each vertex 156 between rods 152 defining two adjacent sides of the upper end structure 152, there is disposed a vertically oriented post or upright rod 158 that connects the vertex to a corresponding vertex 156' of the lower end structure 154. The resulting open cage 150 thus appears to be octagonal when looking axially downward along viewing line V, or upward from the bottom along the same axis, but from the side might appear to be rectangular in profile. The overall shape appears to be similar to certain coach-style lanterns or other similar structures, except there are no solid or glass sides in the FIG. 5 embodiment and the side or sides of the cage are instead entirely open to allow free circulation of water through the cage (but as shown in FIGS. 11A/11B, 12A/12B and 13, other embodiments may provide solid or closed sides). In some embodiments, the cleaning apparatus cage is a polygon when looking axially downward along viewing line V, or upward from the bottom along the same axis (e.g., 150). In some embodiments, the cage is a regular polygon. In other embodiments, the cage is an irregular polygon. In some embodiments, the cage is a polygon having a number of sides which is a multiple of 4. See FIGS. 10A, 10B for different configurations.

The top end 152 and bottom end 154 in the example non-limiting embodiment each provide a hub and spoke structure similar to a wagon wheel but with (in the embodiment shown) straight sides 152 rather than curved ones. Thus, top portion 152 includes a hub 160 and a plurality of spokes 162 extending outwardly from the hub to the vertices 156. In the example non-limiting embodiment, spokes 162 have identical lengths and thus hub 160 is located directly in the center of the octagon shape defined by upper end 152. In other embodiments, the structure could be asymmetrical or only partly symmetrical, depending on the application.

In the FIG. 5 embodiment shown, the upper end 152 mirrors the lower end 154 so that overall cage 150 is symmetrical and the upright posts 158 are exactly vertical and perpendicular to the octagonal side pieces 152. However, in other embodiments, the structure can be asymmetrical and/or the uprights 158 can be angled rather than perpendicular and not exactly vertical.

Figure 6:
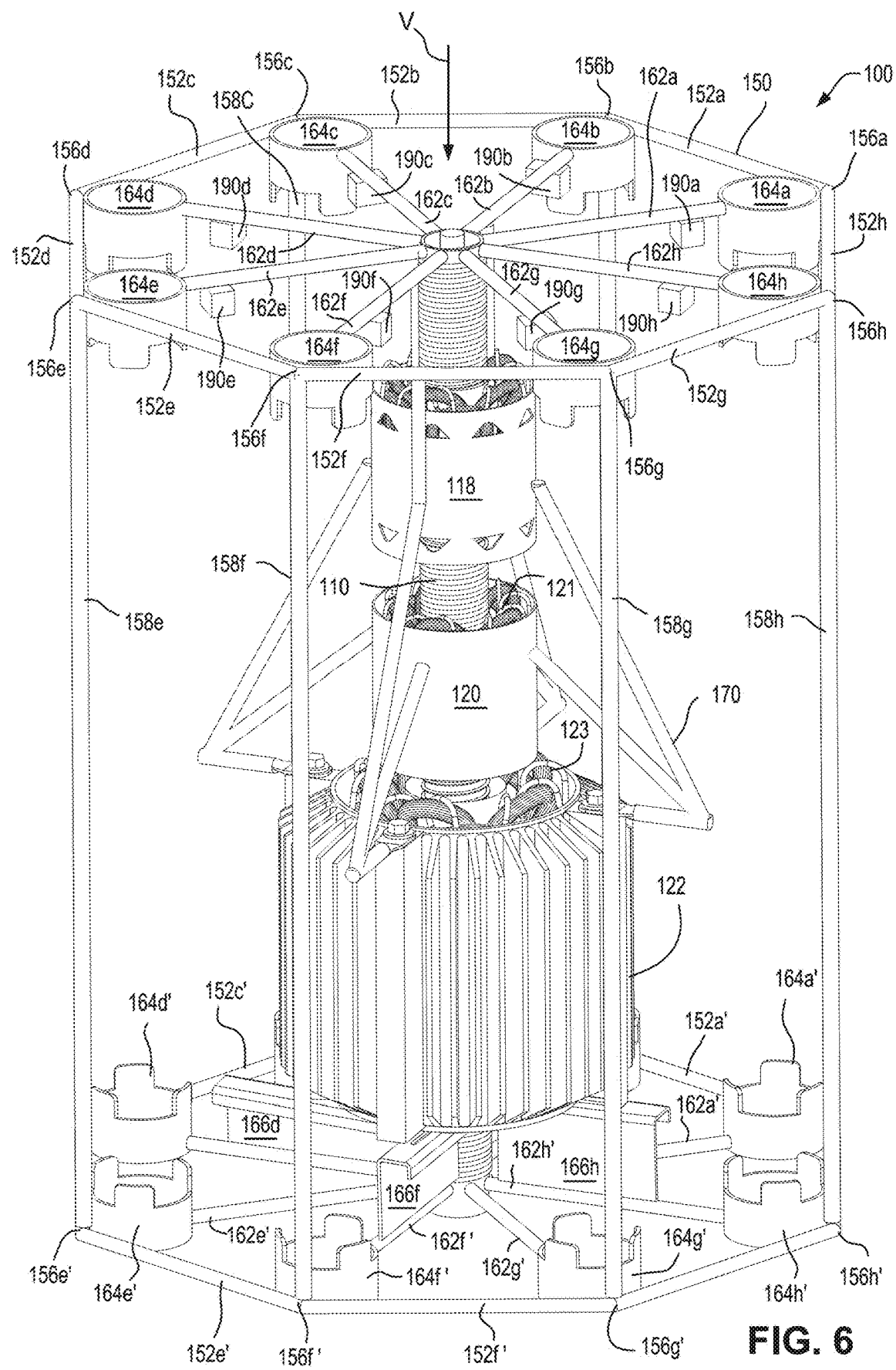
FIG. 6 shows an example non-limiting embodiment including the FIG. 4 electromagnet stack mounted within the FIG. 5 cage.

FIG. 5 shows that ends 152, 154 include hubs 160, 160' for retaining the electromagnet stack 106 centrally located within the cage 150. In the example shown, hubs 160, 160' secure the upper and lower ends 110, 112 respectively of the rod electromagnet. As FIG. 6 shows, some additional structures such as flanges 166 and angled mounting bars 170 are used to fixedly retain the electromagnet stack 106 in a centrally-located fixed position within cage 150. The rotational position of electromagnet stack 106 within cage 150 is believed not to be critical such that the electromagnet stack can be rotated in position relative to upright bars 158. Similarly, the rotational orientation of each of field coil assemblies 118, 120, 122 relative to cage 150 or one another is believed not to be critical to the operation of example embodiments.

In the example shown, a retaining ring 164, 164' is disposed at the intersection of each adjacent pair of octagon-side pieces 152, 152' and a spoke 162, 162'. Such rings 164, 164' in the example embodiment are hollow and each top ring 164 is coaxial with and aligned with a lower ring 164'. As will be explained below, the rings 164, 164' are used in example non-limiting embodiments to secure cylindrical electrode assemblies 104. In the example shown, eight cylindrical electrode assemblies are provided—one at each vertex 156, 156' between adjoining octagonal-side pieces 152, 152'. In the example shown, the various cylindrical electrode assemblies are all vertically aligned with axis V.

Example Electrolysis Electrodes 104

Figure 7:
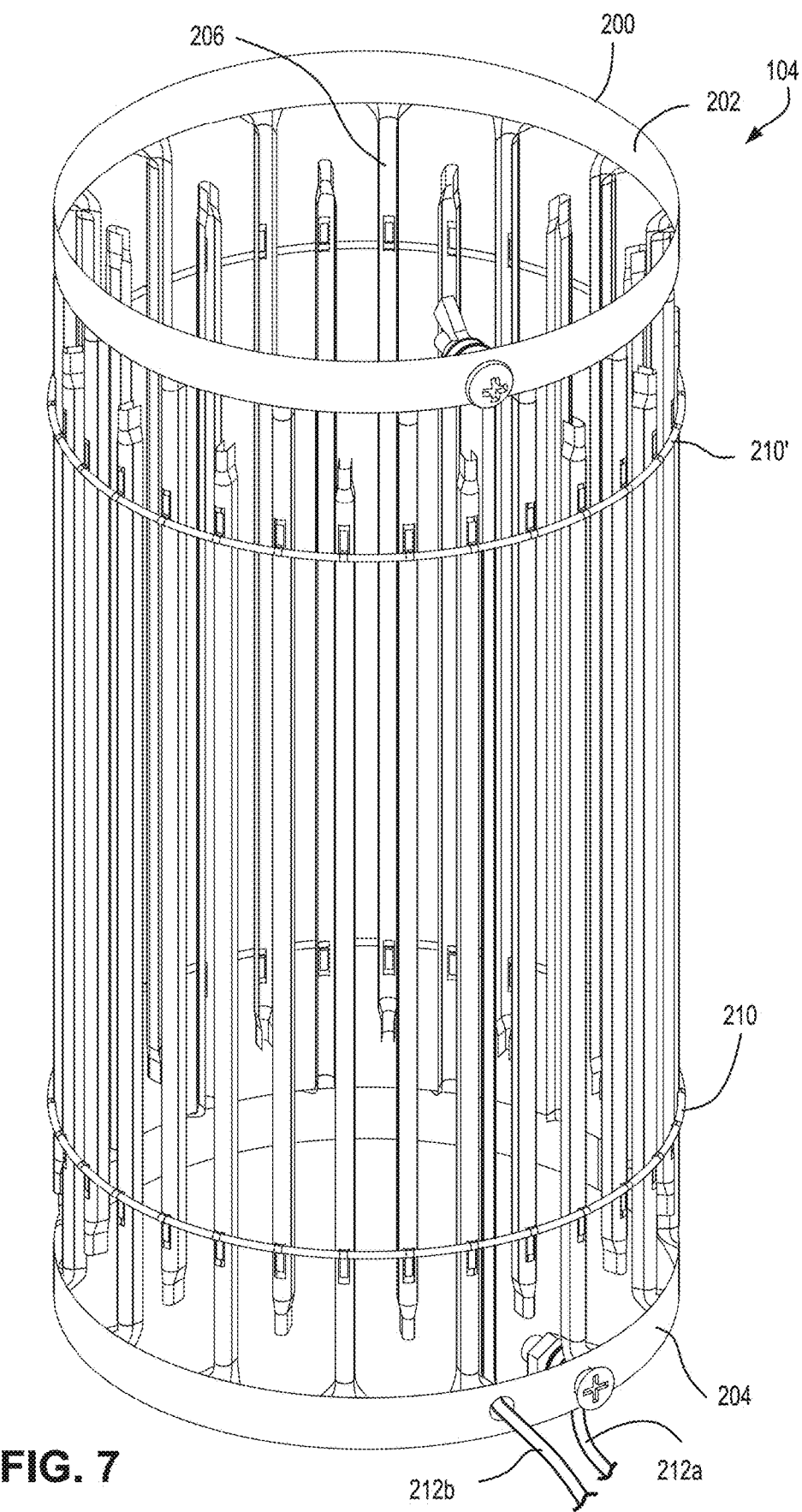
FIG. 7 shows an example non-limiting electrolysis electrode structure.

FIG. 7 shows an example non-limiting electrolysis electrode assembly 200 that provides electrolysis electrodes 104. Assembly 200 includes a top ring 202 and a bottom ring 204.

Electrically-connected fingers 206 integral to the top ring 202 and spaced about the ring's circumference extend downward from the top ring toward but not touching the bottom ring 204, and electrically-connected fingers 208 integral to the bottom ring 204 and spaced about its periphery extend upwardly towards but not touching the upper ring 202. The fingers 206, 208 thus are interleaved, with each downwardly-extending finger 206 being adjacent to two upwardly extending fingers 208, and vice versa.

In the example non-limiting embodiment, non-conductive binding rings 210 retain the fingers 206, 208 in position so they do not electrically contact one another. Each finger 208 comprises an electrically conductive material such as aluminum, which is slotted to provide high surface area. In the example shown, each finger 206 is shaped as a "V" in cross-section. However, other shapes such as cylindrical (○), rectangular (□), planar (–) or the like can be used.

In the particular implementation shown, the spacings between adjacent fingers 206, 208 are uniform or substantially uniform. In one particular embodiment, the spacing can be set at ⅜" center-to-center or ¼" (e.g., 3 mm) edge-to-edge. In one example embodiment, the assembly 200 can be 8" high and 4" in diameter.

As shown in FIG. 7, two lead conductors 212 connect to the electrode assembly 200. One lead 212A connects to the upwardly-extending fingers 208 and the other lead 212B connects to the downwardly-extending fingers 206. In the example non-limiting embodiment, lead 212A is connected to one polarity of DC power supply 108, and the lead 212B is connected to the other polarity of the DC power supply. Thus, the alternating fingers 206, 208 have alternating electrical polarities, i.e., "+ – +– . . . " in the example embodiment. In the example non-limiting embodiment, electrolysis is performed between each pair of fingers 206, 208 by applying a sufficient DC voltage potential between the upper and lower rings 202, 204 (e.g., at least 1.3 to 1.7 VDC) so that current flows via the electrolyte in the water W in which the assembly is immersed and the production of hydrogen gas is promoted.

In its broadest sense, the electrodes of the provided cleaning apparatus 100 can generally have any shape that can effectively conduct electricity through the aqueous electrolytic solution between itself and another electrode, and can include, but not be limited to, a planar electrode, an annular electrode, a spring-type electrode, and a porous electrode. The anode and cathode electrodes can be shaped and positioned to provide a substantially uniform gap between a cathode and an anode electrode pair. On the other hand, the anode and the cathode can have different shapes, different dimensions, and can be positioned apart from one another non-uniformly. In some example non-limiting implementations, an important relationship between the anode and the cathode can be for a sufficient flow of current through the anode at an appropriate voltage to promote the production of hydrogen gas.

The cell passage of the robust cell forms a gap between the at least one pair of electrodes having a gap spacing between about 0.1 mm to about 0.5 mm; and wherein the operating voltage can be between about 3 and about 6 volts or about 9 volts or about 12 volts. The robust cells are stacked in this embodiment to form elongated hollow tubular structures having their peripheries defined by the active electrodes, each tubular structure defining therein a gas bubble passageway that extends upwardly toward a surface of a liquid in which the apparatus is to be submersed within. Gas bubbles may form within the tubular structures as well as on the outside peripheries of the tubular structures, where they rise to toward the surface. Such rising bubbles can cause particles within the liquid to elevate to the surface S.

The electrode material routinely can be selected from those known in the art. In some embodiments, anodes and/or cathodes of the apparatus comprise one or more elements selected from for example iron, copper, carbon, aluminum, graphite, steel, nitrogen-doped carbon, tantalum, titanium, zirconium, iridium, palladium, platinum, niobium or a nitride, a carbide, a carbon nitride and a tantalum, titanium, zirconium, nickel, silver, and tin.

In some embodiments, anodes and/or cathodes of the cleaning apparatus comprise a coating/layer (e.g., cladding or plating). In some embodiments, the coating comprises one or more of for example: titanium, niobium, tantalum, ruthenium (e.g., ruthenium dioxide), rhodium, manganese (e.g., manganese dioxide), iridium, palladium, platinum, nickel, tin, gold, or pyrolytic graphite, or an oxide or alloy of two or more metals, or a mixture of two or more alloys or metal layers thereof. In particular embodiments, the electrodes comprise tin or an oxide or alloy thereof. In some embodiments, the anodes and/or cathodes of the apparatus comprise a coating having a thickness of 0.1 µm to 4.0 µm.

Electrode Spacing:

In some embodiments, the apparatus contains an anode and cathode electrode spacing of 0.5-10 mms, 1-8 mm, or 1-5 mm. In preferred embodiments, the apparatus contains an anode and cathode electrode spacing of ¼" or 2 mm or 3 mm.

Electrode Assembly:

In some embodiments, the cleaning apparatus contains a cylindrical electrode assembly (e.g., 200) that provides alternating anodes and cathodes. In some embodiments the spacing of the alternating electrodes in the electrode assembly is 0.5-10 mms, 1-8 mm, or 1-5 mm. In preferred embodiments, the alternating electrodes in the electrode assembly of the cleaning apparatus have a spacing of ¼" or 2 mm or 3 mm.

In some embodiments, the cleaning apparatus 100 has at least one electrode assembly containing 2-40, 4-30, 6-30, 10-30, 15-30, or 18-24, alternating anodes and cathodes. In some embodiments, the cleaning apparatus contains a circular electrode assemblies containing 24 alternating anodes and cathodes. In some embodiments the spacing of the alternating electrodes in the electrode assembly is 0.5-10 mms, 1-8 mm, or 1-5 mm.

In some embodiments, the cleaning apparatus contains 1-24 cylindrical electrode assemblies. In some embodiments, the cleaning apparatus contains 1-24, 2-16, 4-12, or 6-12, circular electrode assemblies. In preferred embodiments, the cleaning apparatus contains 8, cylindrical electrode assemblies.

In particular embodiments, the cleaning apparatus contains 8 cylindrical electrode assemblies having 24 alternating anodes and cathodes. In some embodiments the spacing of the alternating electrodes in the electrode assemblies is 0.5-10 mms, 1-8 mm, or 1-5 mm.

Voltage Ranges for Electrolysis:

In some embodiments, electrolysis is performed at 1-10, 2-8, or 3-5 V. In a preferred embodiment, electrolysis is performed at 4 VDC or 6 VDC or 9 VDC or 12 VDC or 15 VDC or 18 VDC or 20 VDC.

Time Ranges for Electrolysis:

In some embodiments, electrolysis is performed wherein electrolysis is performed for 15 minutes to 2.5 hours, 30 minutes to 2 hours, 45 minutes to 1.5 hours, or 30 minutes to 1 hour or 30 minutes to 48 hours.

Figure 8:
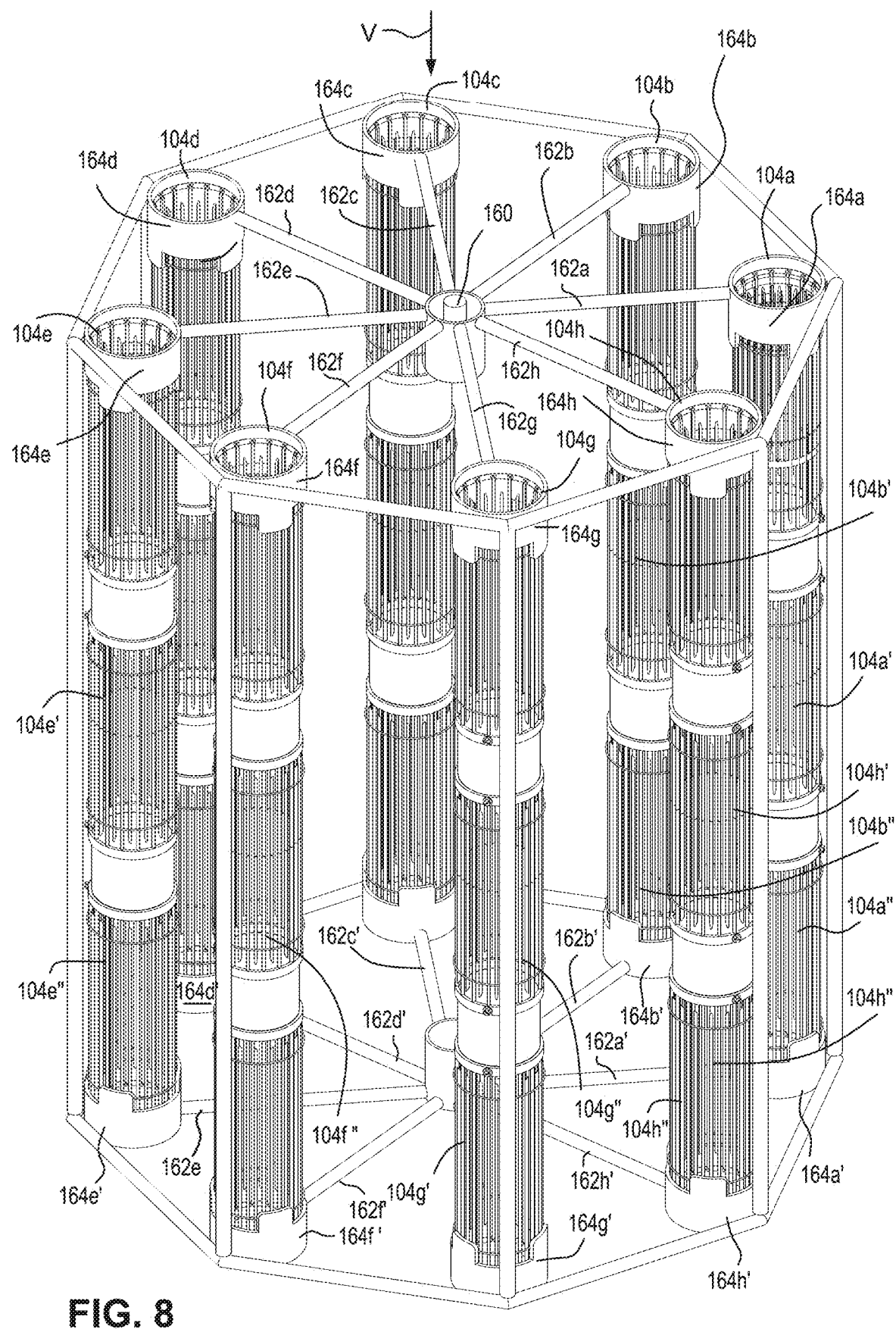
FIG. 8 shows the example non-limiting embodiment providing the FIG. 5 cage populated with FIG. 7 electrolysis electrode structures.

As shown in FIG. 8, multiple electrode assemblies 200 are provided within cleaning apparatus 100. These electrode assemblies 100 can be stacked one on top of another to provide a multi-tiered (here three-tiered) electrode structure retained by rings 164, 164'. Thus in the non-limiting implementation shown, there are eight cylindrical electrode structures 104 disposed within cage 150, each electrode structure 104 being stacked three-high to provide a total of eight cylindrical hollow electrode tubes each running the length of the cage and each being oriented axially to axis V. In one example non-limiting embodiment, the electrode assemblies 200 are all connected together in parallel to power supply 200 so that the same electrical potential exists between each adjacent pair of fingers 206, 208. As explained above, when the electrode assemblies 104 are immersed in water W in which a salt such as aluminum sulfate is dissolved, and a DC electrical potential is connected across the top and bottom portions of the electrode assemblies, electrolysis occurs between each adjacent finger pair 206, 208 thereby providing substantial electrode surface area within the peripheral interior of cage 150.

Figure 8A:
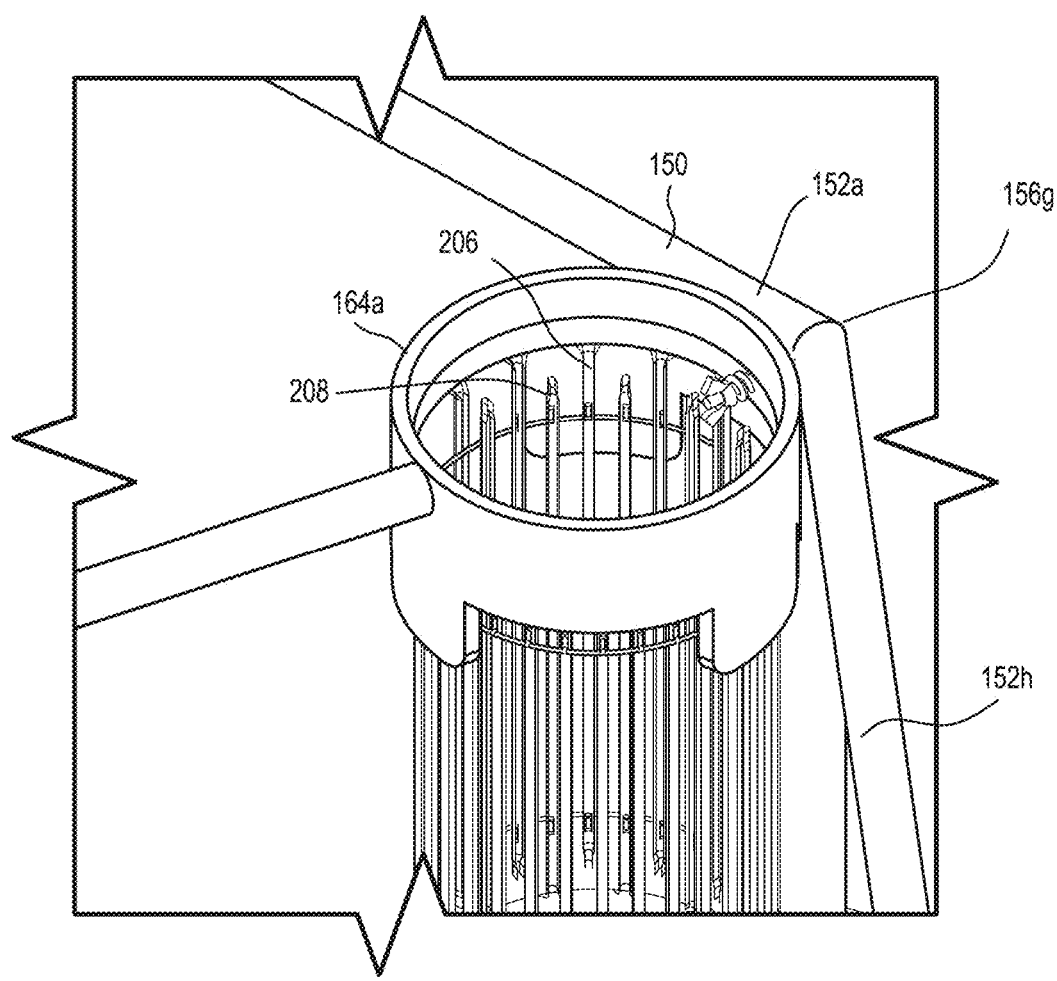
FIG. 8A shows an example mounting of the FIG. 7 electrolysis electrodes within the FIG. 5 cage.

FIG. 8A shows that the electrode assemblies 200 are mounted to rings 164, 164' in such a way that the rings ruggedly mechanically retain the electrode assemblies without electrically shorting out the adjacent fingers 206, 208. As shown in FIG. 8B, the tubular electrode assemblies 200 are stacked in such a way that non-conductive ring spacers electrically separate electrode assemblies while providing for example three-high assembly stacks, each of which enclose a continuous cylindrical space open at each end, through which water can circulate between the adjacent finger pairs 206, 208. The electrode assemblies 200 are electrically connected in parallel so the full potential of the power supply is impressed across all adjacent electrode finger pairs 206, 208.

Combined Apparatus

Figure 9:
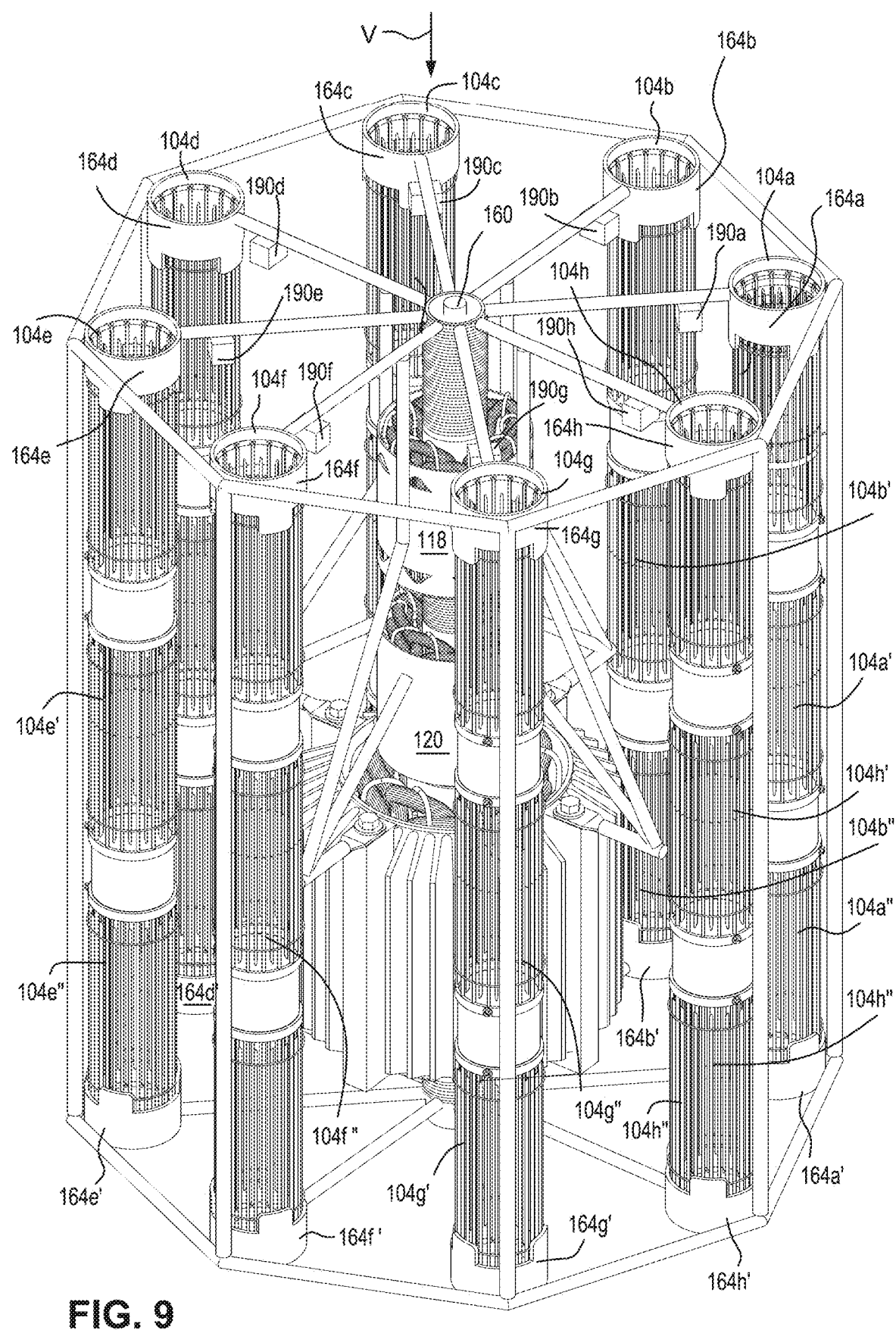
FIG. 9 shows an example non-limiting cleaning apparatus embodiment including both the electromagnet stack and electrolysis electrode structures as well as rare earth permanent magnets.

FIG. 6 shows a cage 150 including electromagnet stack 102, and FIG. 8 shows cage 150 including electrolysis electrodes 104. FIG. 9 shows a combined apparatus in which cage 150 includes both electromagnet stack 102 and electrolysis electrodes 104. In addition, the FIG. 9 apparatus includes rare earth permanent magnets 190 disposed at the cage upper end portion, one on each spoke 162. The rare earth magnets 190 attract ferromagnetic particles, resulting in "beards" of particles hanging from the permanent magnets. These permanent magnets 190 are placed near the outer periphery of cage 150 so their magnetic fields do not unduly interfere with the magnetic field pattern the electromagnet stack produces.

Figure 11B:
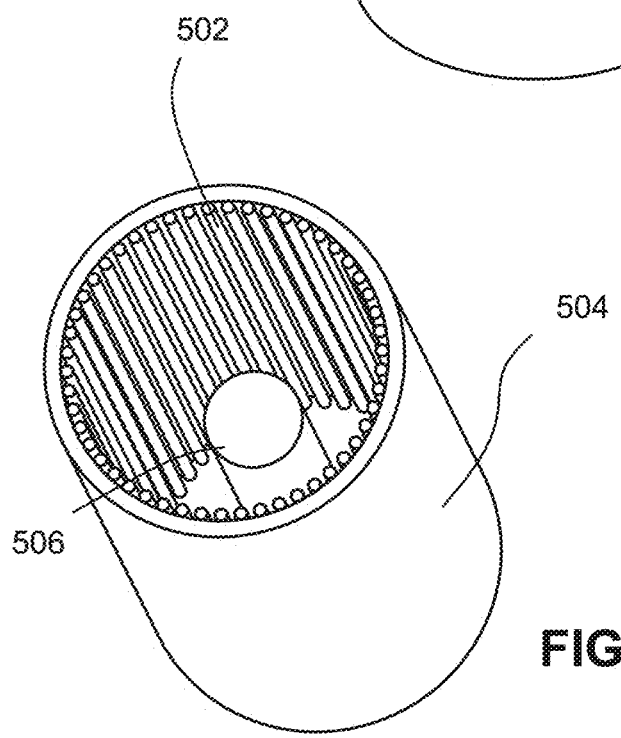

FIGS. 11A-11B, 12A-12B and 13 show alternative embodiments. FIG. 11A-11B shows an immersible or submersible cylindrical embodiment 500 that includes a closed cylindrical wall 504 open at both ends and having alternating electrodes 502 disposed on inner cylindrical walls. A magnet or electromagnet 506 may be disposed in or near the core of the closed cylinder. In some instances, the cylindrical wall 504 may be water-impermeable and in other instances it may be water-permeable. In some embodiments the magnet or electromagnet 506 may be disposed outside the cylindrical wall 506 or wrapped around the outer cylindrical wall.

Figure 12A:
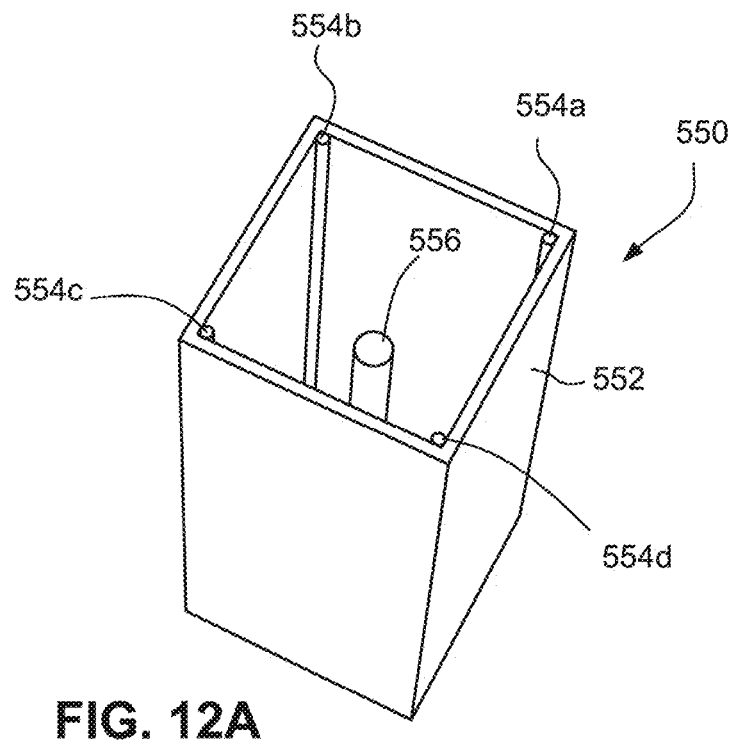
FIGS. 12A-12B show another alternative example configuration of an apparatus.
Figure 12B:
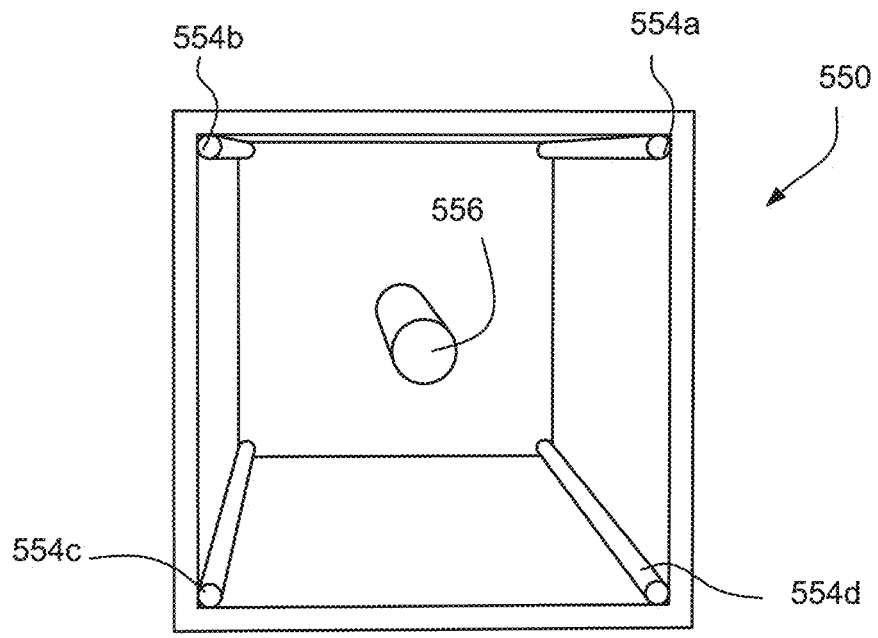

FIG. 12A-12B shows a rectangular apparatus 550 having a rectangular housing 553 with an electrode 554 disposed at each corner and a magnet or electromagnet 556 disposed at or near the core of the rectangular structure. The rectangular housing 553 can be water-impermeable or water-permeable, and may be open at one or both ends or closed at one or both ends.

Figure 13:
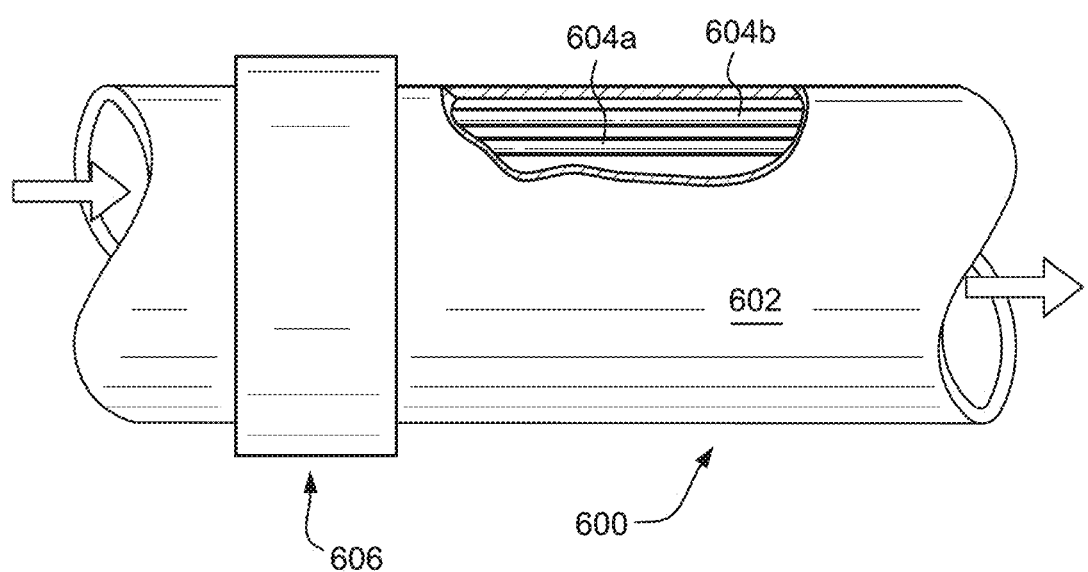
FIG. 13 shows another alternative example configuration of an apparatus.

FIG. 13 shows a continuous flow embodiment 600 including a cylindrical pipe, culvert or other water carrying structure 602. A magnetic field collar 606 disposed on the outside of the pipe 602 generates a magnetic field, and electrolysis electrodes 604 disposed within the pipe are connected to a DC current to provide electrolysis of water W continuously flowing within the pipe. The magnetic field collar 606 may comprise insulated conductive windings, a permanent "doughnut" type magnet of the type used for MRI devices, etc. The length of the electrodes 604 along the pipe and the length of the magnetic collar 60 may be determined based on the flow rate of the water within the pipe 602. The collar 606 may be disposed before the electrodes 604 in terms of flow direction, after the electrodes or at the same position as the electrodes. The collar 604 may be longer than the electrodes 604, shorter than the electrodes or the same length as the electrodes. Vents and other mechanisms may be provided to vent or capture gases and levitated flocculated material, or an in-line filtration system may be provided to capture the flocculant or slurry.

The FIG. 13 continuous processing embodiment 600 provides for water W to continuously flow through a cylinder or other water carrying structure of any configuration and be exposed to a magnetic field and/or electrolysis (which may be located at or near the same point in the pipeline or may be staged so that the water is exposed to a magnetic field first and before undergoing electrolysis or the water is exposed to electrolysis first before being exposed to a magnetic field or the water is exposed to electrolysis and magnetic field at the same time for at least part of the time it is exposed to either electrolysis or a magnetic field (i.e., the magnetic field may extend over a length of the pipe that is longer that the length of the pipe over which electrolysis extends, or over a length of the pipe that is shorter that the length of the pipe over which electrolysis extends, or over a length of the pipe that is the same as the length of the pipe over which electrolysis extends, and may be co-located or differently located relative to one another). In the FIG. 13 embodiment, the flow rate of the water and length of the pipe over which the electromagnets and the electrolysis electrodes are disposed determines how long the water is exposed to a respective magnetic field and electrolysis.

It is also possible to provide additional magnetic fields localized to each of the electrolysis grids in the cage embodiments above.

Example

In one non-limiting example use, a quantity (e.g., 467 grams) of coal ash is added to a quantity (e.g., 220 gallons) of water in an enclosed tank slightly larger than cleaning apparatus 100, and the cleaning apparatus is entirely immersed in the tank. The water is maintained at an outdoor temperature in the range of 45-75 degrees Fahrenheit. In some embodiments, the method/process is performed at room temperature, 50-60 degrees, 65-75 degrees, etc. (too cold may not be good for some example non-limiting processes).

Power supply 108 is then connected to the electromagnets described above, and the voltage and current of the power supply are varied (e.g., 60 amps or 100 amps, and 6 VDC or 12 VDC) for period of approximately 45 minutes as follows:

6 VDC at 60 amps for 10 minutes;

12 VDC at 70 amps for 10 minutes;

12 VDC at 98 amps for 10 minutes;
12 VDC for 60 minutes.

The power supply 108 is then disconnected from the electromagnets (see FIG. 2A). A quantity of Epsom salt (magnesium sulfate) is added to the tank, and the water in the tank is agitated to dissolve the salt into the water.

Figure 14A:
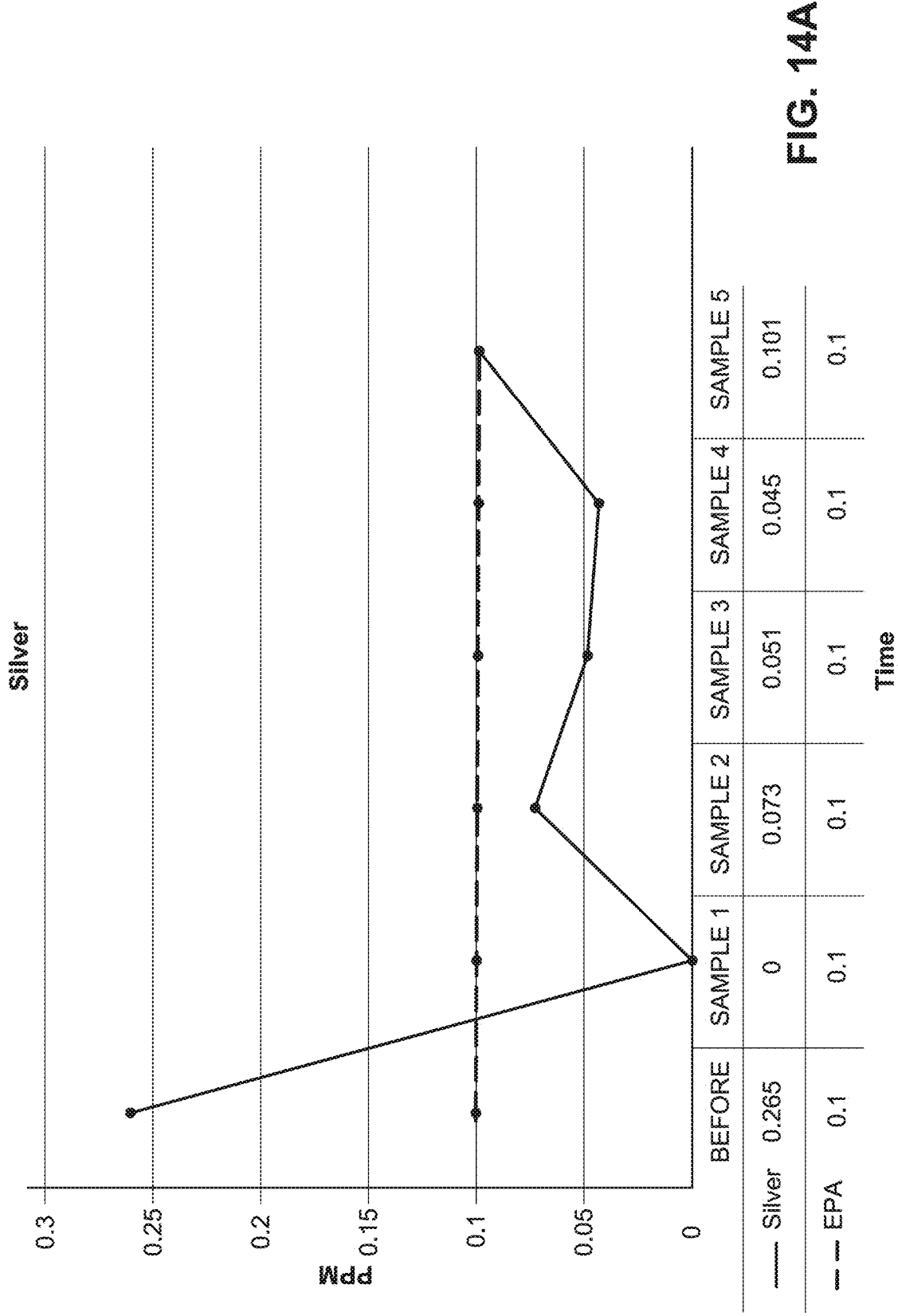
Figure 14B:
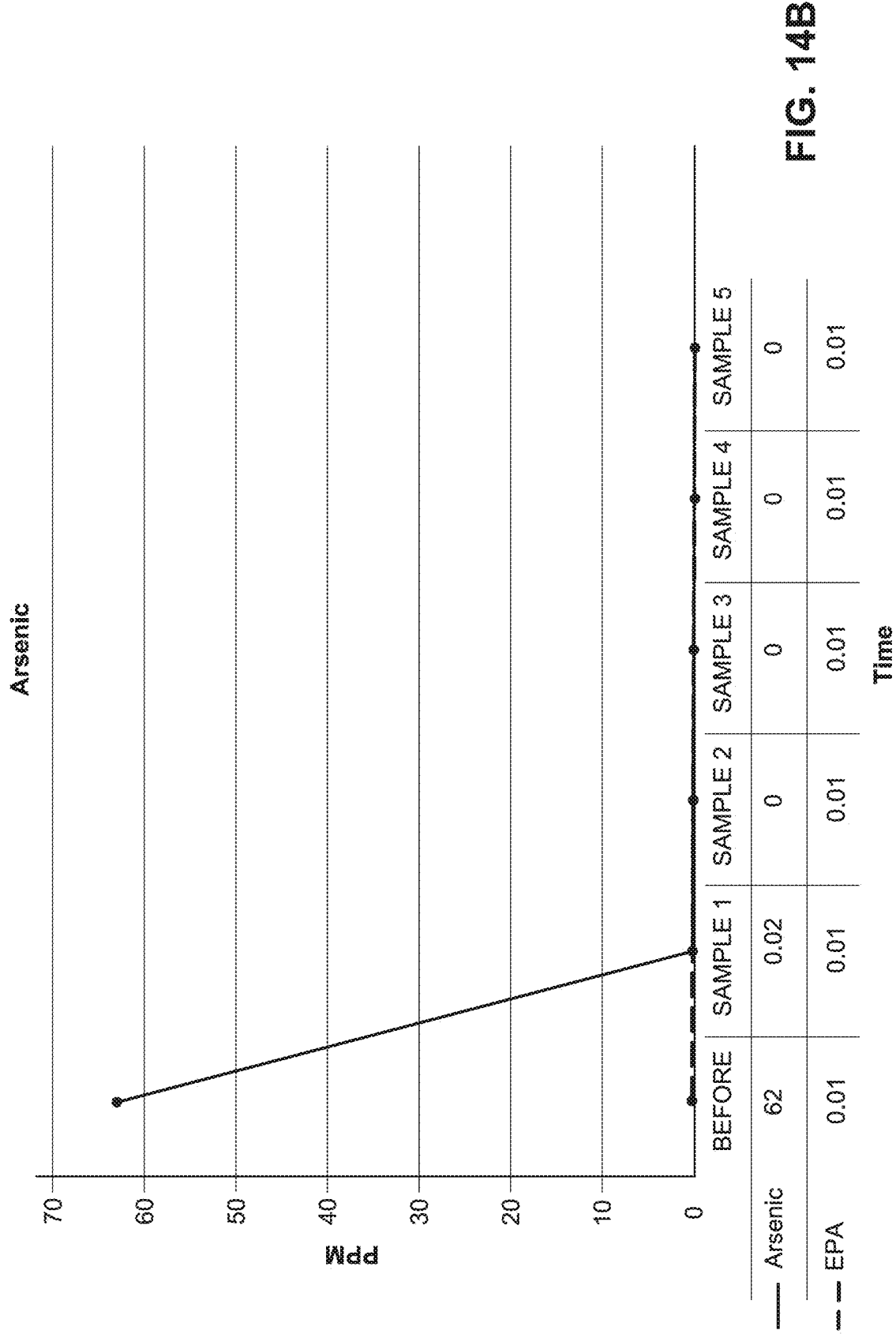
Figure 14C:
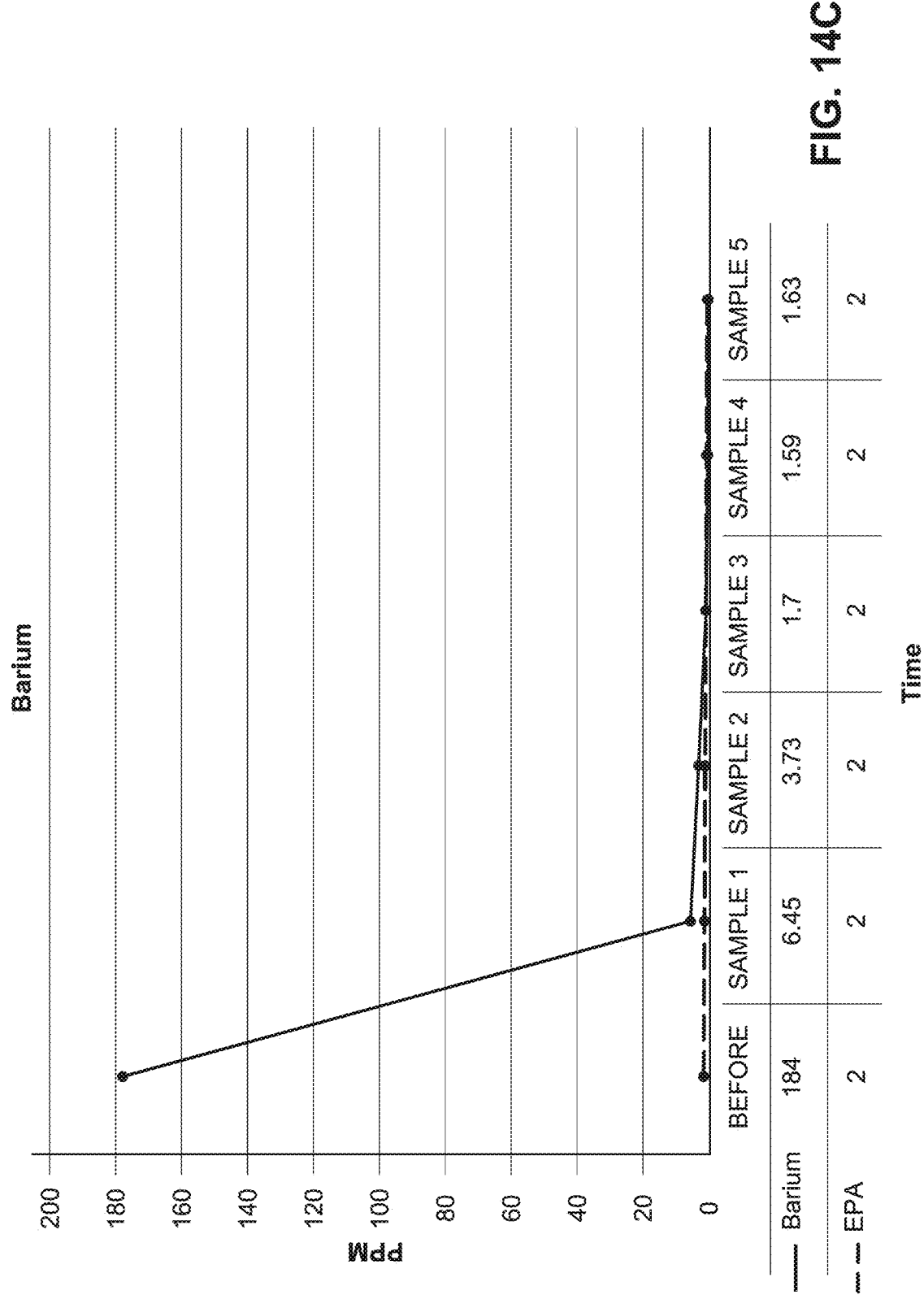
Figure 14D:
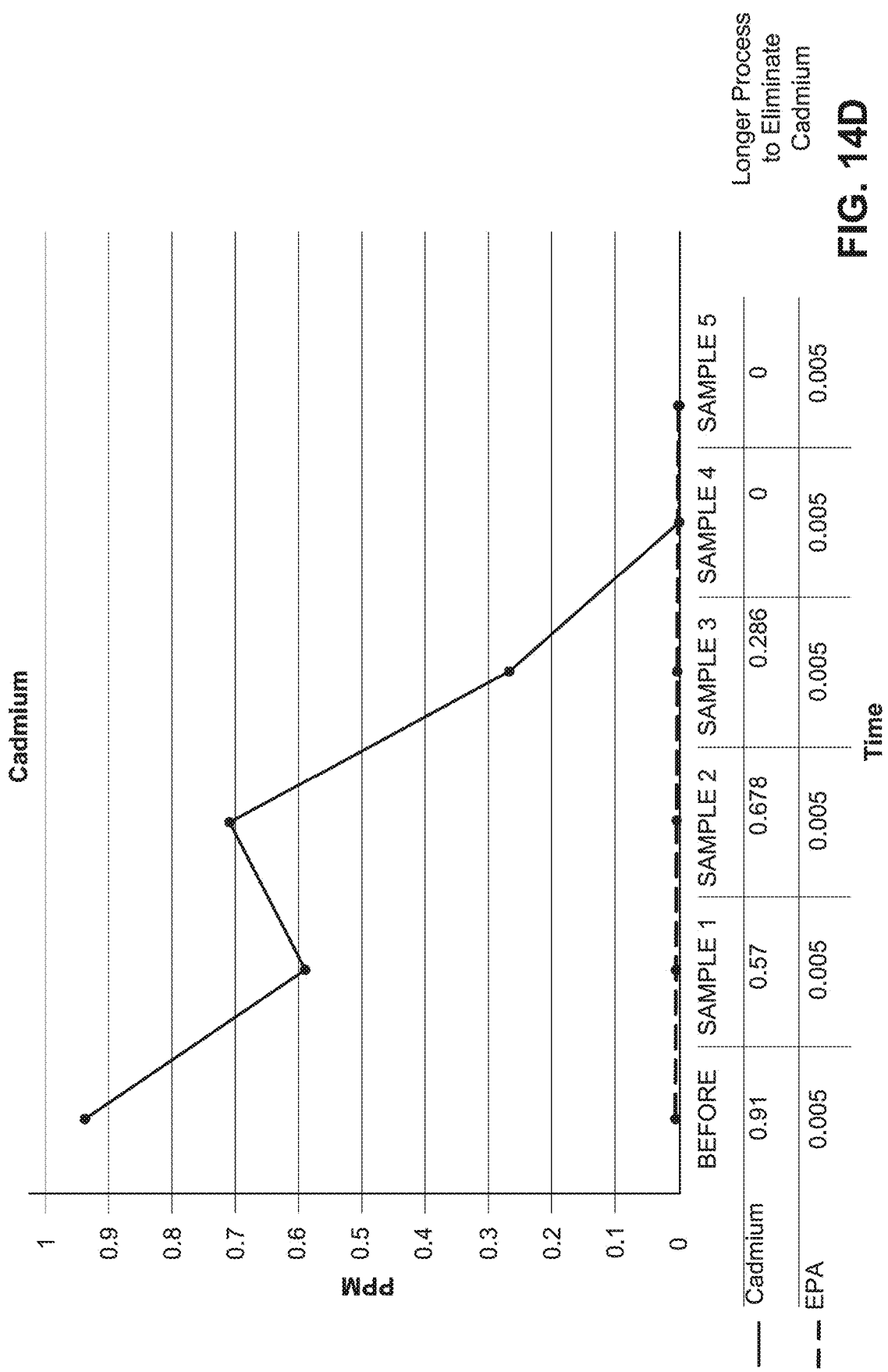
Figure 14E:
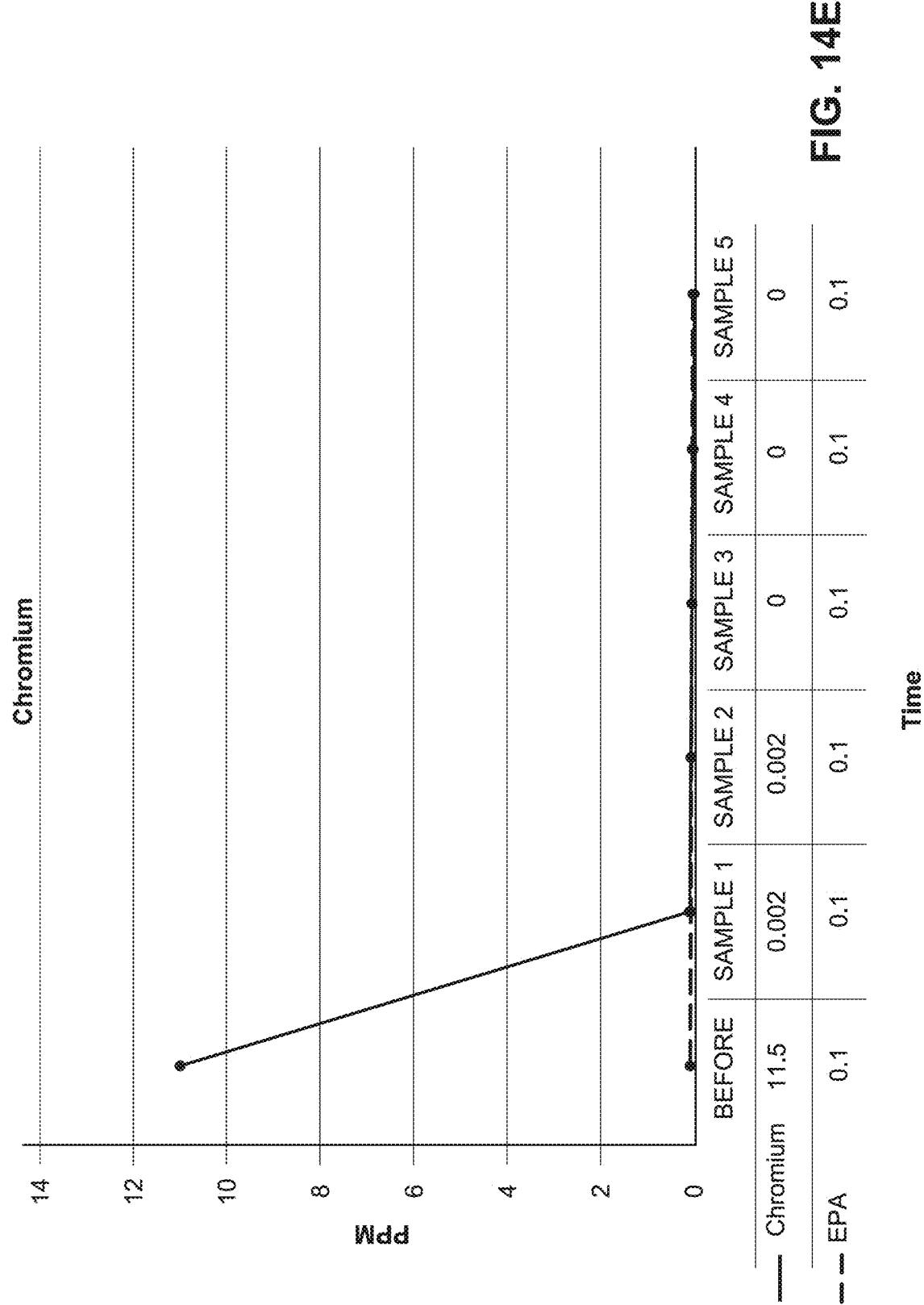
Figure 14G:
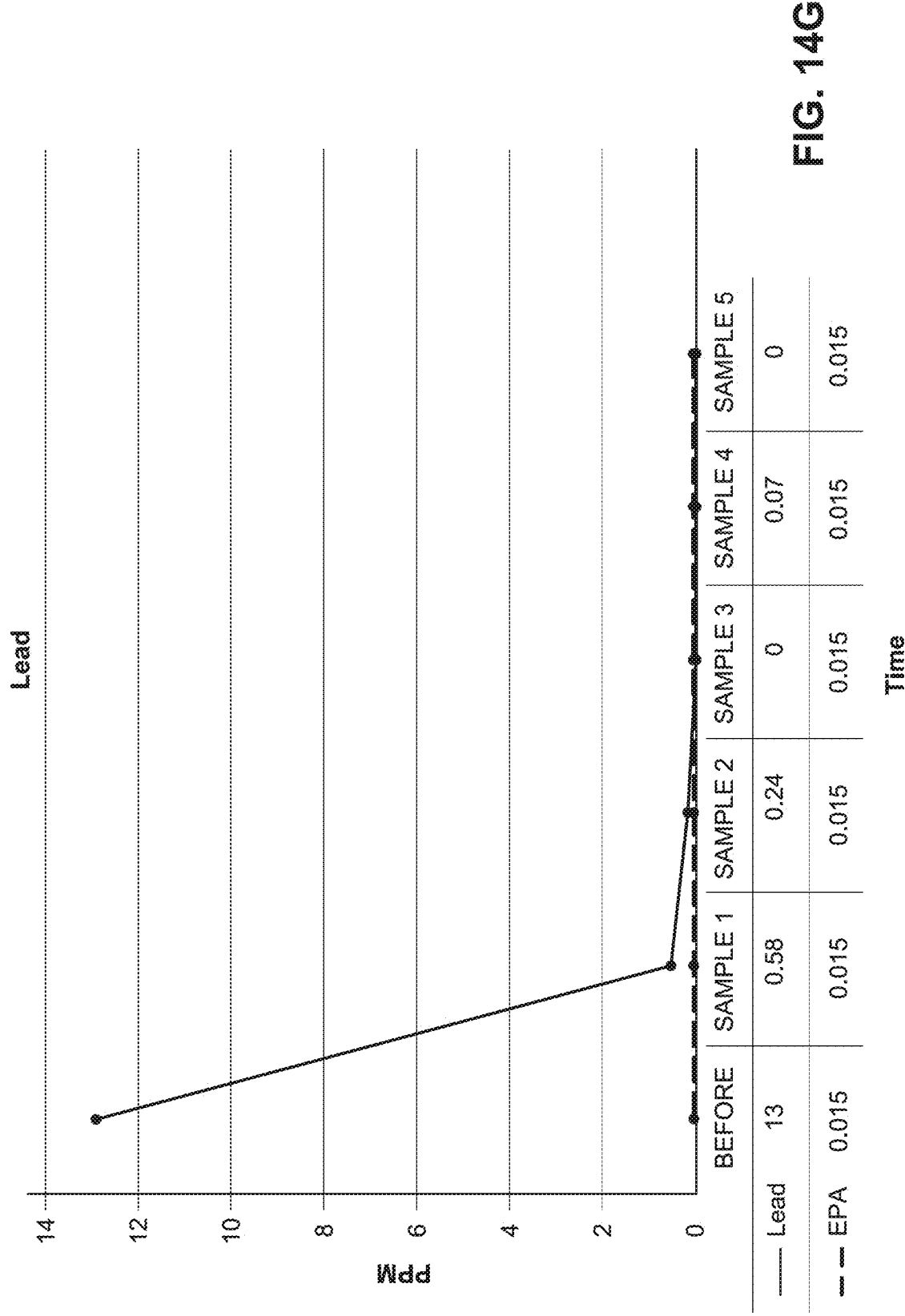
Figure 14H:
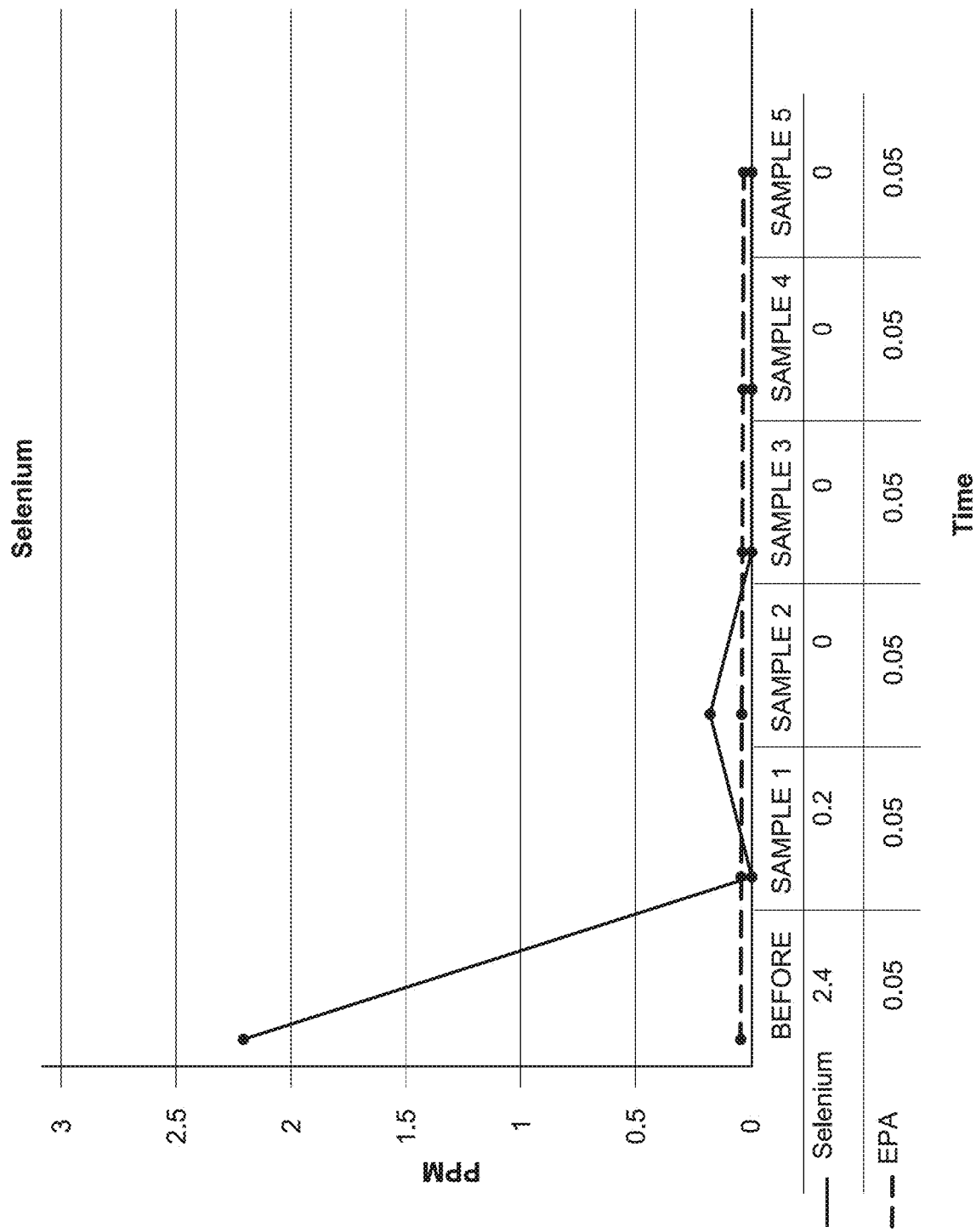

The power supply 108 is then connected to the electrolysis electrodes 104 at 12 VDC and 120 amps. Surface effects such as shown in FIGS. 3A and then 3B are observed over the course of approximately an hour or more. The Table I above shows and FIGS. 14A-14F show test results from water samples taken before, during and after such treatment:

FIG. 14A shows an initial silver (Ag) concentration in the wastewater of in excess of 0.25 ppm before treatment, with the concentration falling to below 0.1 ppm as treatment progressed (the samples were taken at time intervals after electrolysis began));

FIG. 14B shows an initial Arsenic (As) concentration of in excess of 60 ppm before treatment, with the concentration falling to essentially zero after treatment;

FIG. 14C shows an initial Barium (Ba) concentration of nearly 180 ppm before treatment, with the concentration falling to less than 10 (e.g., less then 7) ppm after treatment began and continuing to fall to less than 2 ppm as treatment progressed;

FIG. 14D shows an initial Cadmium (Cd) concentration of more than 0.9 ppm before treatment, with the concentration falling to near zero as treatment progressed (the concentration of Cd took some time after electrolysis began to fall, decreasing first to about 50%, then to about 25% and finally to nearly zero);

FIG. 14E shows an initial concentration of Chromium (Cr) of about 11 ppm before treatment, falling to close to zero as treatment progressed;

FIG. 14F shows an initial concentration of Mercury (Hg) of over 0.5 ppb, falling to approximately $\frac{1}{10}^{th}$ of that as treatment progressed;

FIG. 14G shows an initial concentration of Lead (Pb) of about 13 ppm before treatment, falling to near zero as treatment progressed; and FIG. 14H shows an initial concentration of Selenium (Se) of over 2 ppm, falling to near zero as treatment progressed The first sample taken before treatment began was nearly opaque and grey, with coal ash suspended in the liquid. The second and third samples were relatively clear and transparent. The third, fourth and fifth samples were orange-brown in color. These various samples were pulled from the reaction volume at about 10 to 15 minute intervals after electrolysis began. In some cases, concentration increased between sample 4 and sample 5, perhaps indicating that once electrolysis was turned off, certain parts of the slurry floating at the surface S might go back into solution. Thus, it may be that in some applications, depending on requirements, the slurry should be skimmed from the surface while electrolysis is still progressing. Successive skimming or a single skimming operation could be provided, depending on the application. All items cited above are hereby incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. Apparatus comprising:
   a support structure that is fully immersible in an aqueous solution containing at least one metal or metalloid in solution, the support structure being shaped in plan view as a polygon having at least first, second and third sides, the first and second sides intersecting at a first vertex, the second and third sides intersecting at a second vertex, the third and first sides intersecting at a third vertex;
   at least one electromagnet mounted on the support structure;
   a first electrolysis electrode assembly mounted on the support structure at or near the first vertex;
   a second electrolysis electrode assembly mounted on the support structure at or near the second vertex; and
   a third electrolysis electrode assembly mounted on the support structure at or near the third vertex;
   wherein:
   the apparatus is structured to be connectable to a power supply for supplying electrical power to the at least one electromagnet and/or the first, second and third electrolysis electrode assemblies,
   the apparatus is further characterized by the at least one electromagnet and/or the first, second and third electrolysis electrode assemblies being configured to substantially reduce concentration of the at least one metal or metalloid in the aqueous solution by causing metal or metalloid to rise to the top of the aqueous solution.

2. The apparatus of claim 1 wherein the at least one metal comprises at least one of arsenic, cadmium, lead and chromium, and the electromagnet and/or electrolysis electrode assemblies are configured to reduce concentration of the metal from significantly measurable to unmeasurably small and/or de minimis and/or functionally unmeasurable and/or significantly reduced.

3. The apparatus of claim 2 wherein the at least one metal comprises barium, mercury and/or selenium, and the electromagnet and/or electrolysis electrodes are configured to reduce concentration of the metal by a factor of at least 100.

4. The apparatus of claim 3 wherein the at least one electromagnet is configured to produce a magnetic field gradient.

5. The apparatus of claim 3 wherein the first, second and third electrolysis electrode assemblies each define an enclosed tubular structure.

6. The apparatus of claim 3 wherein the first second and third electrolysis electrodes assemblies each define an elongated cylindrical cage.

7. Apparatus comprising:
   at least one electromagnet immersible in an aqueous solution containing at least one metal or metalloid in solution; and
   at least one pair of electrolysis electrodes;
   wherein:
   the apparatus is structured to be connectable to a power supply for supplying electrical power to the at least one electromagnet and/or the electrolysis electrodes,
   the apparatus is further characterized by the electromagnet and/or electrolysis electrodes being configured to substantially reduce concentration of the at least one metal or metalloid in the aqueous solution by causing metal or metalloid to rise to the top of the aqueous solution,
   the electromagnet and/or electrolysis electrodes are configured to reduce concentration of at least one of arsenic, cadmium, lead and chromium from significantly measurable to unmeasurably small and/or de minimis and/or functionally unmeasurable and/or significantly reduced, the electromagnet and/or electrolysis electrodes are configured to reduce concentration of at least one of barium, mercury and/or selenium the metal by a factor of at least 100, and the electrolysis electrodes define plural elongated cylindrical cages around the periphery of the at least one electromagnet.

8. Submersible apparatus comprising:

a support structure;

at least one electromagnet disposed within the support structure; and an array of plural vertically-oriented tubular electrolysis electrode assemblies mounted onto the support structure about a periphery of the at least one electromagnet, the tubular electrolysis electrode assemblies each comprising interdigitated spaced-apart electrodes connected to alternating electrical polarities.

9. The submersible apparatus of claim 8 wherein each of the plural tubular electrolysis electrode assemblies comprises alternating anodes and cathodes, each tubular electrolysis electrode assembly defining a gas bubble passageway therein that extends vertically upwardly toward a surface of a liquid in which the apparatus is to be submersed within.

10. The submersible apparatus of claim 8 wherein the at least one electromagnet comprises:

an electromagnet stack defining a core; and a vertically-oriented rod electromagnet disposed through the core.

11. The submersible apparatus of claim 10 wherein the electromagnet stack comprises a stack of AC induction motor field coils operated on DC current.

12. The submersible apparatus of claim 8 wherein the electrolysis electrode assemblies comprise at least 8 cylindrical electrode assemblies each having 24 alternating anodes and cathode electrodes and wherein the spacing of adjacent ones of the alternating electrodes in the electrode assemblies is 0.5-10 mms, 1-8 mm, or 1-5 mm.

13. The submersible apparatus of claim 8 wherein the apparatus is structured so that the electromagnet and the electrode assemblies are separately electrically activatable.

14. The submersible apparatus of claim 8 wherein the apparatus is structured to process a continuous liquid flow.

15. The submersible apparatus of claim 8 wherein the apparatus is structured to generate gas bubbles that carry particles upward to a surface of a liquid.

16. The submersible apparatus of claim 8 further including a rare earth magnet disposed on the support structure.

17. The submersible apparatus of claim 8 wherein the support structure is shaped in plan view as a polygon having at least first, second and third sides, the first and second sides intersecting at a first vertex, the second and third sides intersecting at a second vertex, the third and first sides intersecting at a third vertex; and each electrolysis electrode assembly is mounted on the support structure at or near a respective vertex.

18. The submersible apparatus of claim 17 wherein the support structure comprises an open cage.

19. The submersible apparatus of claim 8 further including plural rare earth magnets mounted to the support structure.

20. The submersible apparatus of claim 8 wherein the tubular electrolysis electrode assemblies each comprise an open cylindrical cage comprising alternating anodes and cathodes.

21. The submersible apparatus of claim 20 wherein the electrolysis electrode assemblies are structured to define an internal cylindrical volume from which a stream of hydrogen bubbles emanates.

22. The submersible apparatus of claim 8 further including an electrical controller that alternately applies power to the electromagnet and the electrode assemblies.

23. The submersible apparatus of claim 8 further including an electrical controller that simultaneously applies power to the electromagnet and the electrode assemblies.

24. The submersible apparatus of claim 8 wherein the at least one electromagnet is centrally mounted within the support structure.

25. The submersible apparatus of claim 8 wherein the apparatus is structured to be fully immersible into an aqueous solution.

26. The submersible apparatus of claim 8 wherein the support structure is shaped as a polygon.

27. The submersible apparatus of claim 8 wherein the support structure is shaped as an octagon.

28. The submersible apparatus of claim 8 wherein the support structure is shaped as a pentagon.

29. The submersible apparatus of claim 8 wherein the support structure is shaped as a regular polygon.

30. Submersible apparatus comprising:

a support structure;

at least one magnet disposed within the support structure; and an array of plural tubular electrolysis electrode assemblies mounted onto the support structure about a periphery of the at least one magnet, wherein the at least one magnet produces a magnetic field gradient that is stronger near a bottom of the apparatus than near a top of the apparatus when the apparatus is oriented to be immersed.

* * * * *